United States Patent
Ding et al.

(10) Patent No.: US 12,200,058 B2
(45) Date of Patent: Jan. 14, 2025

(54) SENTINEL DEVICES IN A LOW POWER SELF-ORGANIZING TRACKING SENSOR NETWORK

(71) Applicant: QUALCOMM Incorporated, San Diego, CA (US)

(72) Inventors: Gang Ding, San Diego, CA (US); Avinash Shrivastava, Hyderabad (IN); Robert Thomas Franzo, Northport, MI (US); Harleen Gill, Los Altos, CA (US); Brian Momeyer, Escondido, CA (US); Bala Ramasamy, San Marcos, CA (US); Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/063,612

(22) Filed: Dec. 8, 2022

(65) Prior Publication Data

US 2024/0195874 A1   Jun. 13, 2024

(51) Int. Cl.
*H04L 67/12* (2022.01)
*H04L 41/149* (2022.01)

(52) U.S. Cl.
CPC ............ *H04L 67/12* (2013.01); *H04L 41/149* (2022.05)

(58) Field of Classification Search
CPC .............................. H04L 41/149; H04L 67/12
See application file for complete search history.

(56) References Cited

U.S. PATENT DOCUMENTS

| | | | |
|---|---|---|---|
| 9,143,178 B1 | 9/2015 | Arscott et al. | |
| 10,585,189 B1* | 3/2020 | Dove | G01S 13/951 |
| 2009/0010189 A1* | 1/2009 | Nagra | H04W 40/10 |
| | | | 370/311 |
| 2009/0201850 A1 | 8/2009 | Davis et al. | |
| 2013/0070636 A1 | 3/2013 | Farley et al. | |
| 2016/0226713 A1* | 8/2016 | Dellinger | H04W 4/80 |
| 2018/0095135 A1* | 4/2018 | Kawasaki | G01R 31/371 |
| 2022/0100571 A1* | 3/2022 | Ohtsuka | G05B 19/41895 |

OTHER PUBLICATIONS

International Search Report and Written Opinion—PCT/US2023/075848—ISA/EPO—Feb. 6, 2024.

* cited by examiner

*Primary Examiner* — Gil H. Lee
(74) *Attorney, Agent, or Firm* — Thien T. Nguyen

(57) ABSTRACT

Systems and techniques are described herein for network organization. For instance, a process can include receiving, from a second sensing apparatus of the self-organizing network, an indication of a first task. The process can further include retrieving a first power profile associated with the first task, determining a current battery level of the at least one battery, predicting a future battery level of the at least one battery based on the current battery level, and the first power profile associated with the first task, and transmitting, to another sensing apparatus, the predicted future battery level.

26 Claims, 8 Drawing Sheets

SENTINEL DEVICES IN A LOW POWER SELF-ORGANIZING TRACKING SENSOR NETWORK

FIELD

The present disclosure generally relates to sensor networks (e.g., a network of sensors for making measurements to obtain data about an environment around the sensor). For example, aspects of the present disclosure are related to systems and techniques for providing one or more sentinel devices in a low power self-organizing tracking network.

BACKGROUND

Shipping and delivery of assets (e.g., goods) is an important activity for many organizations. Organizations may want to keep track of and monitor an environment around assets being shipped. Tracking assets helps organization keep tabs on where the assets are and when they may arrive. Monitoring the environment may be useful for ensuring quality for assets which may be sensitive to environmental conditions, such as assets which are sensitive to temperature, light, shock, humidity, tilt angle, or a host of other environmental conditions.

Tracking and sensing devices (e.g., sensors) may be included with shipped assets to provide the tracking and environmental monitoring. For example, sensors may be used at a truck/container level, pallet level, case level, etc., and often these sensors travel together. In many cases, the sensors are battery operated and are relatively low-cost devices. The different levels of sensors may provide different information about the environment and/or perform different tasks. For example, sensors on or within a case may monitor environmental conditions close to a product or sense whether individual cases are missing. Sensors at the pallet level, for example, may provide more advanced (e.g., earlier) information about potentially changing conditions. Sensors at the truck/container level may provide tracking or location information. Sensors may be grouped to help efficiently gather and distribute information. Systems and techniques for spreading tasks to be performed by the sensors across the grouped sensors may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for performing operations associated with a self-organizing network. In one illustrative example, a first sensing apparatus of a self-organizing network is provided. The first sensing apparatus includes at least one battery: at least one memory comprising instructions: and at least one processor coupled to the at least one memory. The at least one processor may be configured to receive, from a second sensing apparatus of the self-organizing network, an indication of a first task: retrieve, from the at least one memory, a first power profile associated with the first task: determine a current battery level of the at least one battery: predict a future battery level of the at least one battery based on the current battery level, and the first power profile associated with the first task: and transmit, to another sensing apparatus, the predicted future battery level.

In another example, a method for network organization is provided. The method includes receiving, from a second sensing apparatus of the self-organizing network, an indication of a first task: retrieving a first power profile associated with the first task; determining a current battery level of at least one battery: predicting a future battery level of the at least one battery based on the current battery level, and the first power profile associated with the first task: and transmitting, to another sensing apparatus, the predicted future battery level.

As another example, a non-transitory computer-readable medium is provided. The non-transitory computer-readable medium, when executed by at least one processor, causes the at least one processor to: receive, from a second sensing apparatus of a self-organizing network, an indication of a first task: retrieve a first power profile associated with the first task: determine a current battery level of at least one battery: predict a future battery level of the at least one battery based on the current battery level, and the first power profile associated with the first task: and transmit, to another sensing apparatus, the predicted future battery level.

In another example, a first sensing apparatus of a self-organizing network is provided. The first sensing apparatus includes means for receiving, from a second sensing apparatus of the self-organizing network, an indication of a first task: means for retrieving a first power profile associated with the first task: means for determining a current battery level of at least one battery: means for predicting a future battery level of the at least one battery based on the current battery level, and the first power profile associated with the first task; and means for transmitting, to another sensing apparatus, the predicted future battery level.

In some aspects, the apparatus comprises a mobile device (e.g., a sensor device, a mobile telephone or so-called "smart phone", a tablet computer, or other type of mobile device), a wearable device, a personal computer, a laptop computer, a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
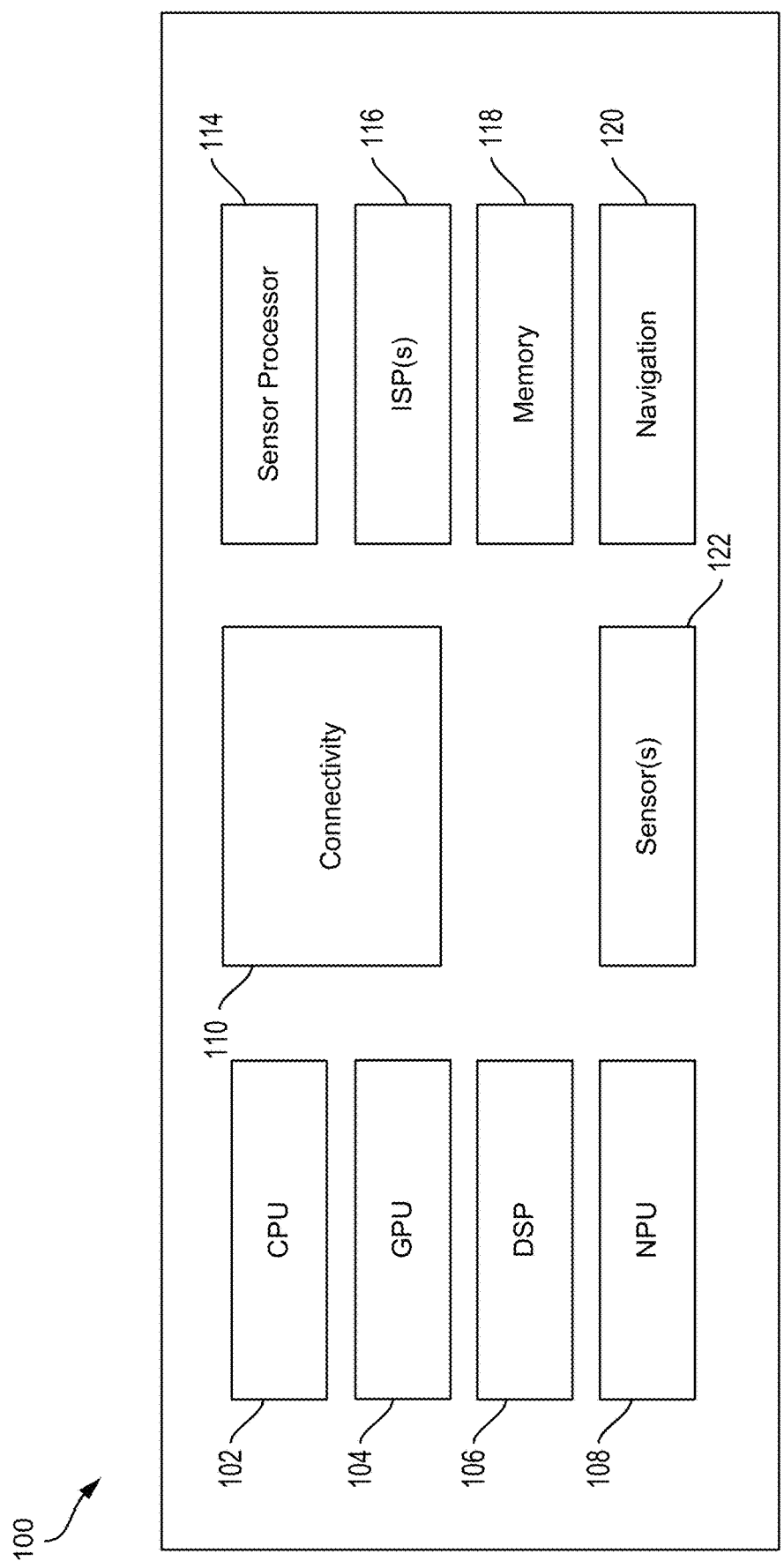
FIG. 1 illustrates an example implementation of a system-on-a-chip (SOC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

When tracking assets being delivered, it may be beneficial for a system to be able to efficiently obtain near-real time information for location, environmental conditions, and other sensed information. For example, such information may be helpful for an organization to provide higher quality goods while reducing costs. Sensors may be used to provide information about assets being delivered: such sensors can be referred to herein as asset tracker devices or trackers. As these trackers travel with the assets being delivered, there may not be reliable external power sources for the trackers. The trackers may thus be battery powered and relatively low powered devices. As different trackers may be used to provide different information for the corresponding assets being tracked, it may be useful to collect, integrate, and/or disseminate this information, while keeping battery usage within acceptable levels. To help coordinate activities and tasks among the trackers, the trackers may be organized into homogenous, hierarchal networks of trackers. For instance, in some cases, the sensors being used as trackers may be organized into one or more self-organized networks (SONs) and a SON of trackers (SONOT).

Systems and techniques are described herein for providing an improved way to distribute task from among devices in a SONOT. For example, in a SONOT, one or more neighboring tracker devices may be used to provide coverage for other tracker devices where there is no infrastructure support for the SONOT. The tracker devices may collaboratively collect and share location, sensing, and/or other information, and may selectively communicate the information to a device (e.g., a server device) that is remote from the SONOT, for example, via a wide area network (WAN).

In some cases, a subset of the tracker devices, known as sentinel devices, may be dynamically selected to perform additional tasks, examples of which may include, but are not limited to, localization tasks, additional sensing tasks, and/or communication tasks. Sentinel devices may be selected from among a set of available tracker devices and multiple sentinel devices may be present at the same time. To help preserve battery life, tracker devices assigned to operate as sentinel devices may be rotated periodically to help spread the operating load among the set of tracker devices. In some cases, any tracker device of the set of tracker devices may be selected as a sentinel device. The selection of a tracker device as a sentinel device may be based on a variety of factors, which may include, but are not limited to, power constraints of the tracker device, location of the tracker device with respect to the assets, a route or journey of the assets, memory available to the tracker device, sensing capabilities of the tracker device, network topology, signal strength for certain wireless networks available to the tracker device, any combination thereof, and/or other factors.

In some cases, tracker devices may be assigned various tasks according to a duty cycle. For example, a tracker device may be assigned a sensing task, such as measuring a temperature of the environment, to be performed every set period of time (e.g., every five minutes). The tracker device can transmit a result of the sensing task (e.g., sensed information, such as the measured temperature information) to a sentinel device. When the tracker device is not performing tasks, the tracker device may enter a relatively low power or sleep mode. In addition to tasks that may also be assigned to other tracker devices, sentinel devices may be assigned tasks that consume relatively more power than the tasks assigned to other tracker devices, such as receiving and processing the sensed information from the other tracking devices. These extra tasks may consume relatively more battery power and sentinel devices may estimate an impact on the sentinel's battery level for these tasks. In some aspects, the estimated impact on the batter level may be determined based on pre-defined power profiles for possible tasks and the duty cycle associated with tasks.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, Ultrawideband (UWB) and the like. In one implementation, the NPU is implemented in the CPU 102, DSP 106, and/or GPU 104. The SOC 100 may also include a sensor processor 114, image signal processors (ISPs) 116, and/or navigation module 120, which may include a global navigation satellite system (GNSS) and/or global positioning system (GPS).

SOC 100 and/or components thereof may be configured to evaluate environmental conditions. For example, the sensor processor 114 may receive and/or process information from one or more sensors 122. Examples of sensors 122 may include one or more Inertial Measurement Units (IMUs) (e.g., an accelerometer, a gyroscope, etc.), temperature sensors, light sensors, shock sensors, humidity sensors, acceleration sensors, speed sensors, tilt angle sensors, etc. sensors of a device. In some cases, the sensors 122 may be located on SOC 100. In other cases, the sensor processor 114 may also be coupled to one or more sensors (not shown) that are external to the SOC 100 (e.g., located on a separate chip). In some cases, the sensor processor 114 may also receive, as input, output of one or more processing blocks of the connectivity block 110.

Moving assets, such as goods, parts, materials, etc., between locations is increasingly an important part of the global economy as supply chains spread out across states, countries, and continents. As moving asserts becomes increasingly important, tracking shipped assets is also becoming to organizations as understanding when assets may arrive and in what condition those assets may be in can be useful for planning operations of the organizations.

To better track and understand environmental conditions asserts may be exposed to as they move, sensor or asset tracking (e.g., tracker) devices may be included with the assets. These trackers may sense the environment around the tracker, gather location information, sense events, and the like. In some cases, the trackers may also periodically report the sensed data. In some cases, trackers may perform non-sensing functionality, such as gathering data from other trackers, command and control operations, such as configuring trackers, scheduling operations of trackers, processing received data, transmitting data, and the like. In some cases, a tracker may include non-sensing functionality in addition to, or instead of the environmental sensing functionality. As the trackers may often be used to track moving assets, the trackers may be relatively low-powered, battery-operated devices. Additionally, trackers often may move in groups with multiple sensors distributed in strategic locations around the assets.

To help enhance battery life of trackers by distributing the activities of the trackers, the trackers may be organized in a dynamic self-organizing network of trackers (SONOT). The SONOT may be dynamically formed by nearby trackers without a need for infrastructure support. In some cases, the SONOT may use any mobile ad hoc network routing protocol, such as on-demand broadcast routing protocols, or routing table-based protocols. Additionally, a SONOT may be formed across a heterogeneous network of smaller SONOTs. In some cases, each SONOT, including sub-SONETs, may use a different network routing protocol.

Figure 2:
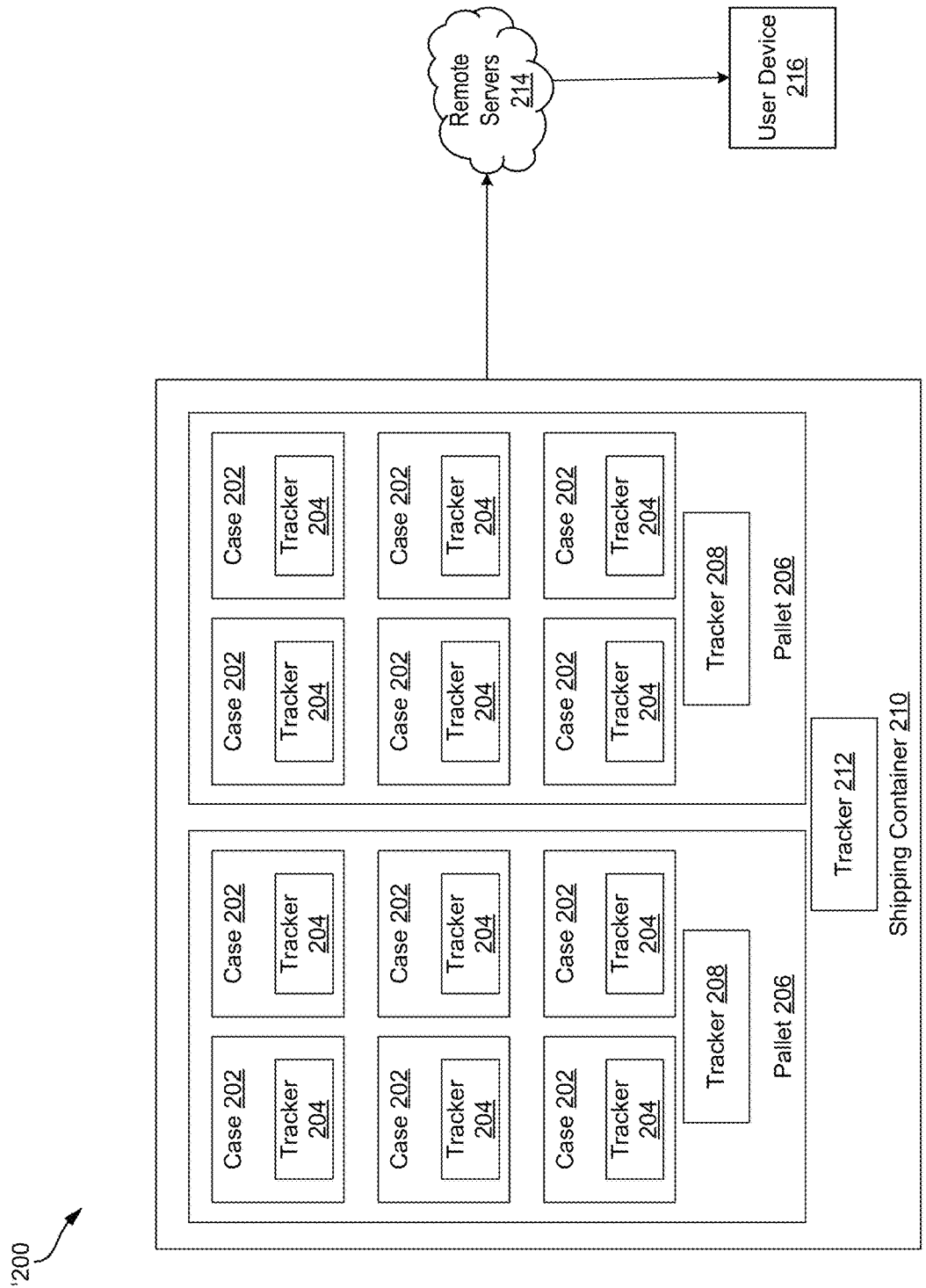
FIG. 2 is a diagram illustrating example SONOT, in accordance with aspects of the present disclosure.

FIG. 2 is a diagram 200 illustrating example SONOT, in accordance with aspects of the present disclosure. As shown in diagram 200, assets (not shown) may be packed for shipping in one or more boxes or cases 202. In some examples, trackers 204 may be included with the assets in a case 202, or trackers 204 may be distributed in a certain percentage of the cases 202. The trackers 204 distributed in the cases 202 may sense environmental conditions within the cases 202, location of the individual cases 202, distribution of the cases 202, and the like. These cases 202 may be loaded onto pallets 206. In some cases, trackers 208 may be included on a certain percentage of the pallets 206 and these trackers 208 may sense environmental conditions around the cases 202 and/or pallets 206, location of the pallets 206, distribution of the pallets 206, and the like. In some cases, a number of cases 202 per pallet 206 may be known in advance based on a size of the cases 202, carrying capacity of the pallet 206, etc. The pallets 206 may in turn be loaded into a shipping container 210, truck, boxcar, and the like. In some cases, trackers 212 may be included in, for example, the shipping container 210 and these trackers 212 may sense environmental conditions within or around the shipping container 210, location of the shipping container 210, and the like.

In some cases, information gathered from the trackers, such as trackers 204, 208, and 212, may be reported to one or more remote servers 214. The remote servers 214 may process the sensed data and provide the processed data to a user device 216. In some cases, the remote servers 214 may process the sensed data in addition to, or instead of any processing of the data that may be performed by the trackers. In some cases, this processed data may be provided to the user device 216 in near real time and the processed data may be provided continuously, periodically, on a schedule, on-demand, or at any other rate. In some cases, the rate at which data may be provided from the trackers 204 may be adjusted dynamically based on customer demands and hardware capability. As the trackers (e.g., trackers 204, 208, and 212) may be relatively low power devices, there may be a trade-off between sensing and reporting activities with battery life or tracker costs. Additionally, some activities, such as receiving and processing sensing data from other trackers or transmitting data to remote servers 214, may use more battery power than other activities, such as sensing.

In some cases, individual tracker devices may be set up for different roles and different costs. Different tracker hardware may be used based on costs and user needs. For example, for high-value assets, relatively more expensive trackers with more features may be used. As an example of these additional features, the relatively more expensive trackers may offer more granular reporting intervals, less latency, more sensing, and the like as compared to less expensive trackers. As another example, for shipments with a large number of assets with relatively stringent environmental concerns, many lower cost trackers may be distributed throughout the assets. These lower cost trackers may have less features than more expensive trackers, but having more of the lower cost trackers may provide additional samples about conditions experiences across the assets. In some cases, a mixture of trackers may be used.

In diagram 200 includes an example of a mixture of trackers 204, 208, and 212 that may fall in three capability groups. A first group of trackers may be represented by trackers 204. As indicated above, tracker 204 may be used at a case 202 level and may be relatively low cost, with relatively less memory, processing power, and/or battery power as compared to other trackers (e.g., trackers 208 and 212). The trackers 204 may be set up primarily for sensing the environment, with short-range communications to participate in a relatively small SONOT.

A second group of trackers may be represented by trackers 208. Trackers 208 may be used at a pallet 206 level and may offer more capabilities, with relatively more memory, processing power, and/or battery power as compared to trackers 204, but relatively less memory, processing power, and/or battery power as compared to other trackers (e.g., trackers 212). In some cases, trackers 208 may be relatively more expensive than trackers 204, while less expensive than other trackers, such as tracker 212. Trackers 208 may be set up for additional sensing, data processing, and/or communications to maintain a relatively small SONOT (e.g., a SONOT of trackers 204 on a pallet) and coordinate with other trackers, such as other trackers 208 and 212.

A third group of trackers may be represented by trackers 212. Trackers 212 may be used at the shipping container 210 level and may offer more capabilities, with relatively more memory, processing power, and/or battery power as compared to trackers 204 and 208. In some cases, trackers 212 may be tied into a power source for the shipping container 210. Trackers 212 may be set up for data processing, location sensing, and/or enhanced communications capabilities for communicating with, and/or managing, multiple local SONOTs, associate with additional devices, and communicating with remote servers 214 via a wide area network.

SONOTs may have a variety of network topologies. In some cases, a single large SONOT may be defined covering substantially all detectable/useable local trackers. However, such a network may not be the most reliable or easiest to sustain. In some cases, a network of smaller SONOTs (e.g., a SONOT of SONETs) may be used.

Figure 3:
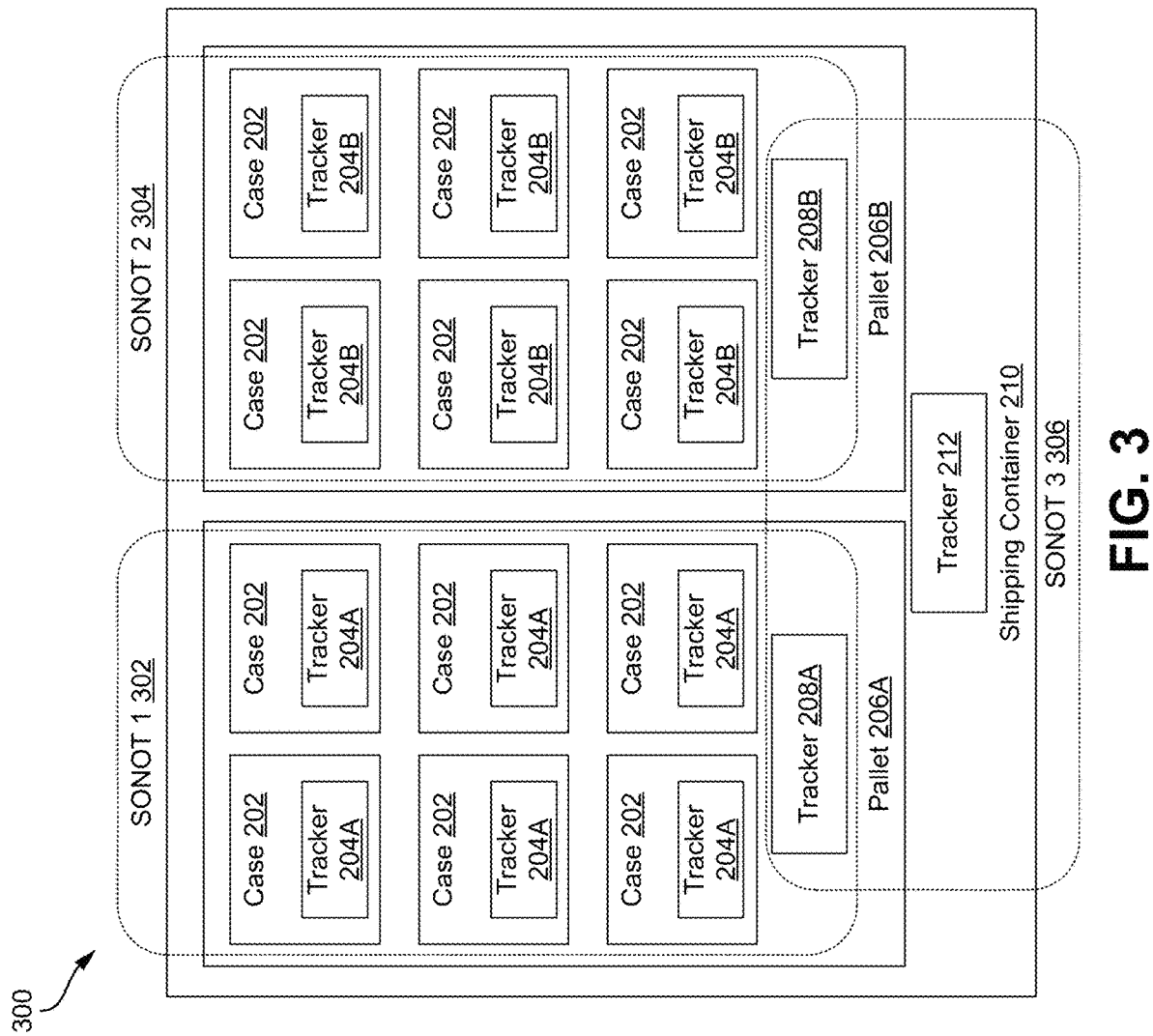
FIG. 3 is a diagram illustrating an example of a hierarchically oriented SONOT network topology, in accordance with aspects of the present disclosure.

FIG. 3 is a diagram 300 illustrating an example of a hierarchically oriented SONOT network topology, in accordance with aspects of the present disclosure. In some cases, a SONOT may be hierarchically oriented such that trackers are organized into levels and trackers at a particular level communicate with a tracker at a higher level. For example, a pallet, such as pallet 206A, may include tracker 208A, and tracker 208A may form a SONOT 1 302 from trackers 204A on pallet 206A. Similarly, for another pallet, such as pallet 206B, may include tracker 208B, and tracker 208B may form a second SONOT 2 304 from trackers 204B on pallet 206B. By forming a pallet level SONOT, such as SONOT 1 302 and SONOT 2 304, trackers 204A and 204B, respectively, may save power by communicating with a tracker, such as tracker 208A and 208B, respectively, that may be physically closer. Additionally, less processing power may be used to communicate among a relatively small SONOT, as compared to potentially larger and more complex network messages that may be used for a larger SONOT.

In some cases, the pallet level trackers, such as tracker 208A and 208B, may communicate with and/or form a third SONOT, such as SONOT 3 306, with a root tracker, such as tracker 212. In some cases, the root tracker, such as tracker 212, may act as a gateway for local SONOTs, such as pallet-level SONOTs SONOT 1 302 and SONOT 2 304, to communicate with remote servers (not shown).

In some cases, SONOTs, such as SONOT 1 302 and SONOT 2 304 may be partially preconfigured. For example, prior to shipping, such as in a packing stage, case level trackers, such as trackers 204A, may be associated with pallet level trackers, such as tracker 208A to form a SONOT, such as SONOT 1 302. In some cases, after the initial preconfiguration or association, the SONOT may be dynamically adjusted. For example, if one or more case level trackers 204A of the SONOT 1 302 runs out of battery power, disappears, or otherwise becomes unresponsive, SONOT 1 302 may adjust to the missing case level tracker 204A, for example, by reconfiguring or reoptimizing the SONOT. As a more specific example, where a particular case level tracker 204A runs out of battery, other environmental conditions of other nearby case level trackers may be sampled to obtain environmental conditions previously tracked by the case level tracker 204A that ran out of battery. As another more specific example, if a first case level tracker 204A functions to route data from a second case level tracker 204A to tracker 208A and the first case level tracker 204A runs out of battery, the second case level tracker 204A may be configured, for example, by tracker 208A, to route data via a third case level tracker 204A. In another example, if one or more case level trackers 204A of the SONOT 1 302 experiences a substantially better signal quality, signal strength, or the like, with another SONOT, such as SONOT 2 304, those one or more case level trackers 204A may be transferred over to the other SONOT. In some cases, the pallet level trackers 208A and 208B may negotiate to hand over such trackers. Additional, in some examples, specific roles played by each tracker, such as trackers 204A and 208A of a SONOT, such as SONOT 1 302 may be adjusted dynamically based on experienced conditions, such as an amount of battery power remaining, wireless connectivity available, journey events, etc.

In some cases, a SONOT of SONOTs may also utilize different network connectivity technologies. In some cases, one network connectivity technology may be used within a SONOT and another network connectivity technology may be used as between SONOTs. For example, case level trackers 204A and 204B may communicate within their respective SONOTs (e.g., SONOT 1 302 and SONOT 2 304) using a first network connectivity technology. The specific network connectivity technology used may be selected based on a variety of conditions including tracker hardware capability, amount of power available, communications range needed, power consumption, tracker size, cost, and the like. As an example, case level trackers 204A and 204B may be low cost and low powered devices which may be relatively close together and thus may utilize lower cost, shorter range network connectivity technologies such as Bluetooth Low Energy (BLE) or radio frequency identification (RFID), which may run using relatively small or even no batteries.

In some cases, higher level trackers, such as pallet level trackers 208A and 208B, may have relatively more battery resources and fewer cost constraints, but may have to communicate with relatively distant trackers at a far end of the shipping container 210. In some cases, higher level trackers may utilize more capable network connectivity technologies such as BLE or Wi-Fi. Additionally, pallet level trackers 208A and 208B may communicate with both lower-level trackers, such as case level trackers 204A and 204B and higher-level trackers, such as tracker 212, and may include multiple network connectivity technologies.

In some cases, root trackers, such as tracker 212 may be set up to perform relatively long-range communications, such as over a wide area network with a remote server, and thus may have additional battery resources. In such cases, the root tracker, such as tracker 212 may utilize network connectivity technologies such as Wi-Fi, cellular technologies, such as a first-generation analog wireless phone service (1G), a second-generation (2G) digital wireless phone service (including interim 2.5G networks), a third-generation (3G) high speed data, Internet-capable wireless device, a fourth-generation (4G) service (e.g., Long-Term Evolution (LTE), WiMax), and/or a fifth-generation (5G) service (also referred to as "New Radio" or "NR"). In some cases, the root tracker, such as tracker 212, may include satellite-based network connectivity technologies. In some examples, the root tracker, such as tracker 212, may also provide location services and may include a global navigation satellite system (GNSS) receiver for geospatial positioning using satellite time signals.

In some cases, a SONOT of SONOTs may be a heterogeneous network where more than one network protocols are used as between SONOTs. In some cases, a network connectivity technology can carry a variety of network protocols. In some cases, one network protocol may be used within a SONOT and another network protocol may be used as between SONOTs. As an example, case level trackers 204A and 204B may communicate within their respective SONOTs (e.g., SONOT 1 302 and SONOT 2 304) using a first network protocol. In some examples, case level trackers 204A and 204B may attempt to save power my utilizing a sleep or low power mode as much as possible, while waking up periodically to sense the environment, sync-up with the SONOT, and exchange data as needed. In some examples, the case level trackers 204A and 204B may utilize a relatively lightweight network protocol that prioritized power savings. In some cases, the case level trackers 204A and 204B may also use the first network protocol to communicate with pallet level trackers 208A and 208B of their respective SONOTs (e.g., SONOT 1 302 and SONOT 2 304).

In some cases, pallet level trackers 208A and 208B may be within a SONOT, such as SONOT 3 306 and pallet level trackers 208A and 208B may communicate within SONOT 3 306 using a second network protocol. In some cases, higher level trackers, such as pallet level trackers 208A and 208B, may utilize a relatively more chatty or lower latency protocol as higher-level trackers may have relatively more battery resources as compared to lower level trackers, such as case level trackers 204A and 204B. In some examples, pallet level trackers 208A and 208B may communicate with a higher-level tracker, such as tracker 212 using the second network protocol or a third network protocol. In some cases, sensed information may be shared among the trackers (e.g., trackers 204, 208, and 212) and selectively communicated to remote servers.

Figure 4:
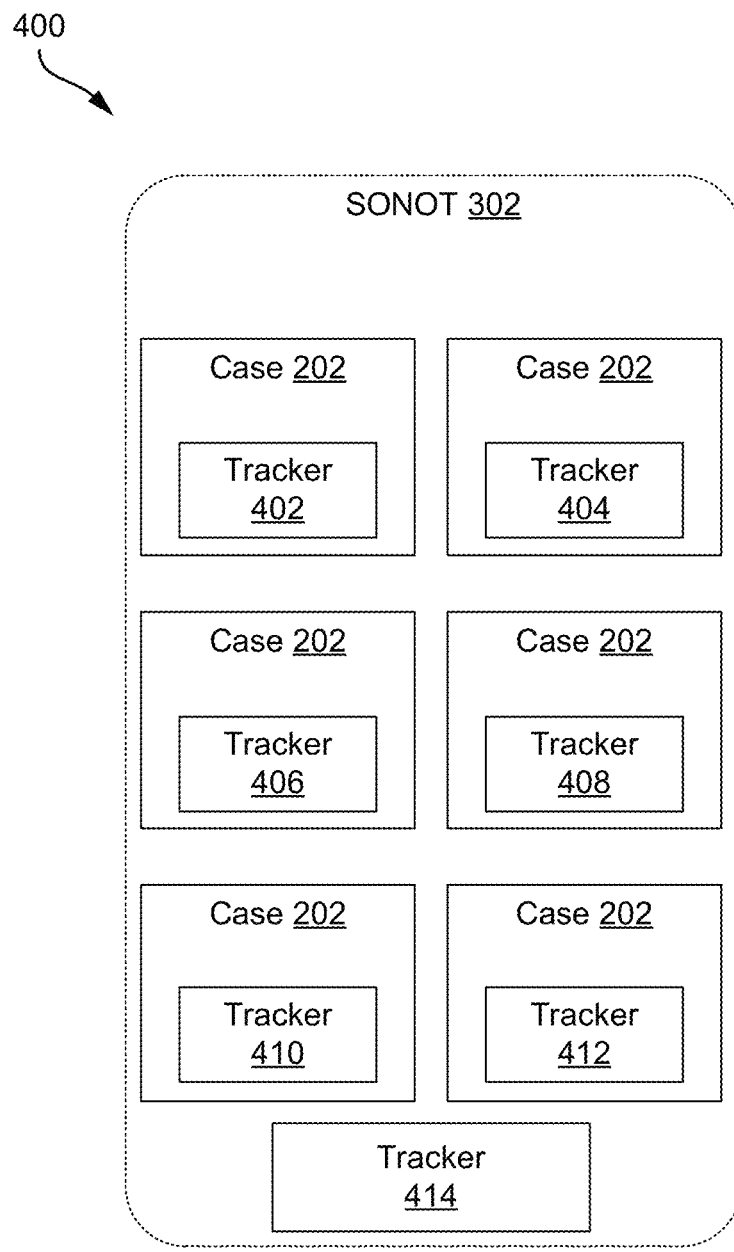
FIG. 4 is a block diagram illustrating an example of sentinels in a SONOT, in accordance with aspects of the present disclosure.

In some cases, a subset of the trackers may be selected to take on a sentinel role while other trackers are in a low power or sleep state. FIG. 4 is a block diagram 400 illustrating an example of sentinels in a SONOT 302, in accordance with aspects of the present disclosure. As shown in diagram 400, SONOT 302 includes six case 202 level trackers 402, 404, 406, 408, 410 and 412, and a pallet level tracker 414. Trackers of the SONOT may be selected for the sentinel role. In some cases, trackers of the SONOT may be dynamically selected for a sentinel role. These sentinel trackers may be assigned additional tasks, such as localization (e.g., determining a location of the SONOT), additional sensing, processing, communications, and the like, as compared to other trackers. As an example, tracker 402 may receive a message from another tracker of the SONOT, such as from tracker 414, assigning tracker 402 to the sentinel role with a task of temperature sensing. In some cases, the message may also include an indication of a duty cycle indicating how often tracker 402 is to perform the sensing. Tracker 402 may then perform the sensing according to the duty cycle. In some cases, certain tasks, such as sensing, may be associated with a default duty cycle. In such cases, the sentinel tracker may provide an indication of a duty cycle, for example, to override the default duty cycle. As another example, the sentinel tracker may not provide the indication of duty cycle to use the default duty cycle.

The sentinel role may be rotated from tracker to tracker to help spread the additional processing load from the additional tasks of the sentinel role and allow other trackers to spend more time in a low power or sleep mode. For example, after some period of time, tracker 402 may stop sensing the temperature based on a received message indicating the tracker 402 can stop sensing, or stop sensing based on a set time/number of samples to sense. The sentinel role may be passed to tracker 404, which may be assigned to perform the temperature sensing. In some cases, multiple sentinel roles may be assigned at the same time and these roles may be either overlapping or different. For example, while tracker 404 is tasked to perform temperature sensing, another tracker, such as tracker 410, may also be operating as a sentinel and tasked to receive sensor data from tracker 404, perform edge processing on the sensor data, and forward on the sensor data to tracker 414. Similarly, tracker 414 may operate in a sentinel role, coordinating the operations of the case level trackers 402-412 of the SONOT 302.

In some examples, any tracker in a SONOT may be selected for the sentinel role. Selection of a tracker for the sentinel role may be based on a number of factors. These factors may include power constraints of the tracker, placement of assets with respect to the tracker, a journey of the asset, memory constraints of the tracker (e.g., an amount of memory available), sensing capabilities of the tracker (e.g., what a tracker can sense and/or how well the tracker can sense), a network topology, signal strength/signal quality of a tracker (e.g., connections available, bandwidth available, signal strength of a connection, etc.), and the like.

In some cases, power constraints of trackers may be an important factor to consider when selecting a tracker to take on a role of a sentinel. As trackers may individually be relatively low-cost with relatively small batteries, efficient power usage may be important to ensuring that there is sufficient power for the journey. A battery level of trackers may be monitored. In some cases, how long a particular tracker is assigned to perform a task as a part of the tracker role may be based on the task being performed and an amount of power used to perform the task. Monitoring battery levels of trackers operating in the sentinel role may help determine when to assign the task to another tracker. For example, tracker 402 may report a current battery level to a tracker operating in a sentinel role for assigning tasks to trackers of the SONOT 302, such as tracker 414. In some cases, trackers of the SONOT 302 may periodically report battery levels to, for example, a sentinel assigned to gather battery level information, configure the SONOT, or another similar task, such as tracker 414. Tracker 414 may obtain information about a power consumption of a tracker such as tracker 402 when performing a task, such as sensing temperature. In some cases, trackers, such as tracker 414, may be able to access a memory preconfigured with power consumption information for trackers of the SONOT based on tasks that may be performed. Tracker 414 may predict a future battery level for tracker 402 after a period of time if the tracker 402 is assigned to perform the task at a certain duty cycle. If the predicted future battery level for tracker 402 is within a certain range (e.g., of the other trackers, within a threshold amount, etc.), tracker 414 may assign the task to tracker 402 to perform at the duty cycle. In some cases, an estimate of an amount of battery power Br of a tracker at time/may be estimated by the formula:

$$B_t = B_{t0} - \sum_{k=0}^{n} P_k D_k (t - t_0),$$

where $B_{t0}$ is the starting battery level, $P_k$ and $D_k$ (k=1 . . . , n) are the power consumption rate and task duty cycle for n different tasks. In some cases, the duty cycle may be configurable from the remote server. In some cases, where a tracker is not assigned a task (e.g., as a sentinel), the tracker may enter a relatively low power or sleep state that consumes a minimal amount of power $P_0$, with duty cycle $$D_0 = 1 - \sum_{k=1}^{n} D_k.$$

In some cases, such as if a tracker is solar powered or is connected to an external power source, such as a power source for the shipping container, power may not be a constraint and such trackers may be more likely to be selected for a sentinel role as they do not have power constraints. In some examples, trackers may be able to indicate that they include a rechargeable or replaceable battery. In some cases, such trackers (with rechargeable or replaceable batteries) may be more likely to be selected for a sentinel role as compared to trackers with non-replaceable/non-rechargeable batteries.

In some cases, a location of a tracker with respect to the assets may be a factor to consider when selecting a tracker to take on a role of a sentinel. In some examples, a shipping container may contain a large number of pallets, and each of these pallets may be stacked with several tiers of cases. During a loading process, cases and pallets may be sorted and/or loaded based on many loading factors. These loading factors may include size, weight, product content, temperature requirements, order of unloading, and/or other environmental factors. In some cases, trackers may be loaded with assets during this forting/loading process. Where a tracker is placed with respect to the assets, cases, and/or pallets can influence which tracker may be selected for a sentinel role. For example, where temperature of an asset is important, tracker 402 or tracker 404 may be selected for temperature sensing in a sentinel role as the shipping container may be warmer towards the top. Similarly, tracker 410 or tracker 412 may be selected to collect and/or forward data from other trackers to tracker 414 as tracker 410 and tracker 412 are relatively close to tracker 414 and may have a better wireless connection with tracker 414 as compared to the other trackers. In some cases, location information of the trackers, for example determined prior or during sorting/loading, and/or an indication of which trackers may be preferred as sentinels based on where the trackers are to be placed may be stored as information in a memory, such as in a manifest, a list, file, database, and the like. In some cases, the manifest, list, file, database, etc. may include predetermined information associated with the trackers, such as a relative location of tracker within cases and/or pallets, preferred trackers for certain tasks, sentinel selection, and the like. In some cases, the manifest may be predetermined during a shipping/packing process. In some cases, a tracker may base task assignments for sentinels on the information stored in the manifest, list, file, database, etc. In some cases, there may be a preference that certain trackers in some locations are not selected as sentinels for certain tasks. For example, the manifest, list, file, database, etc. may indicate that, while a tracker (e.g., tracker 410 or tracker 412) may support obtain location information, those trackers should not be used for localization as they are located near the bottom of the pallet and are likely to have poor signal quality/strength.

In some examples, which trackers may be selected for a tracker role may be based in part on an asset journey. The asset journey may refer to an expected path of the assets and may include expected waypoints, routes, and transport modes. For example, when shipping an asset, an expected journey for the asset may be that the asset may be moved via a first truck to a first port where the asset may be loaded onto a ship bound for a second port. At the second port, the asset may be loaded onto a second truck bound for a destination. In some cases, information about the expected journey may be stored in a memory accessible to the trackers. The information about the expected journey may include information about which trackers may be selected for tasks during portions of the journey. For example, rough road conditions may be expected for the first truck portion of the journey, and the information about the expected journey may indicate that certain trackers, such as those including gyroscopes or impact detectors, may be preferentially selected as sentinels with sensing tasks. Similarly, the information about the expected journey may indicate that trackers with humidity sensors may be preferentially selected as sentinels during the portion of the journey on the ship. In some cases, the information about the expected journey may also indicate a preference that certain trackers are not selected as trackers for certain portions of the journey. For example, the information about the expected journey may indicate that trackers with certain WAN communication capabilities that are not expected to be available on the ship (e.g., cellular communications) may preferentially be not selected as sentinels during the portion of the journey on the ship. In some cases, the information about the expected journey may be based on location of waypoints.

Figure 5:
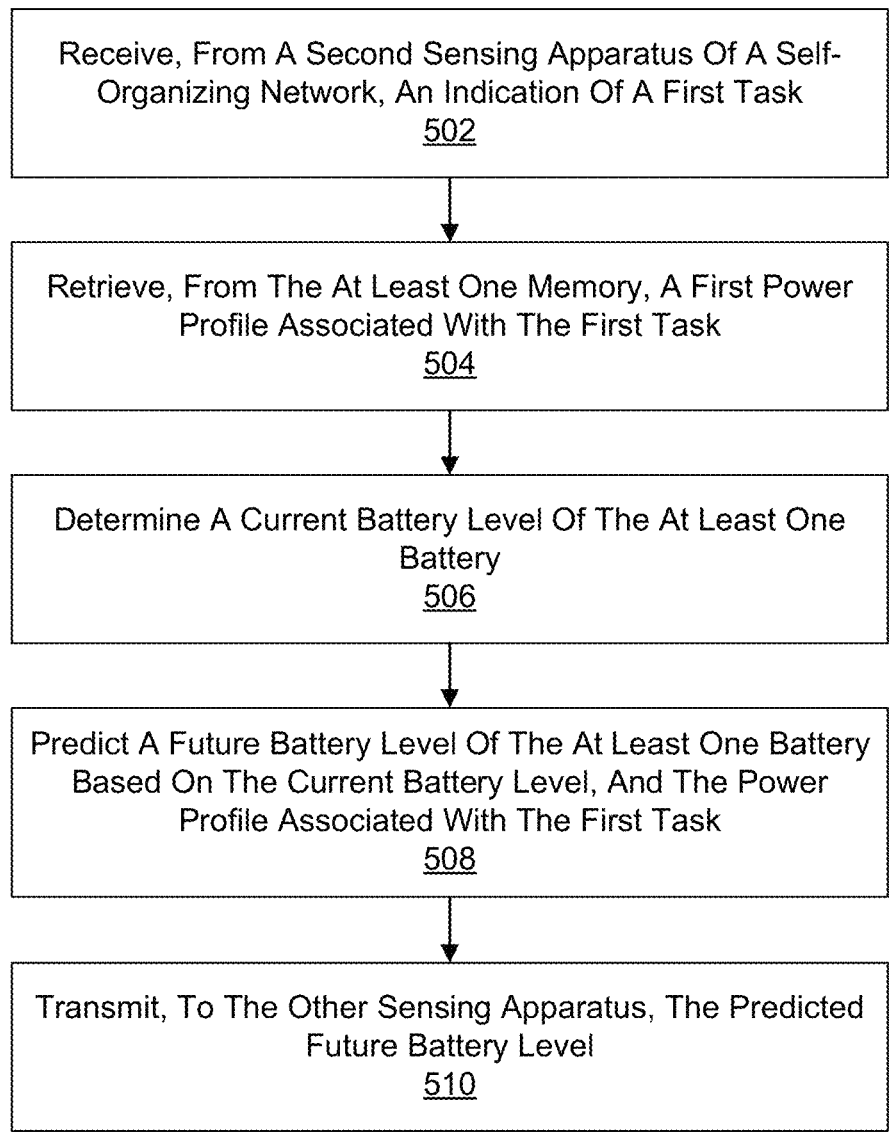
FIG. 5 is a flow diagram for a process for operating an apparatus, in accordance with aspects of the present disclosure.

FIG. 5 is a flow diagram for a process 500 for operating an apparatus, in accordance with aspects of the present disclosure. The process 500 may be performed by a computing device (or apparatus) or a component (e.g., a chipset, codec, etc.) of the computing device. The computing device may be a tracking device, a sensing device, mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include tracking devices, such as trackers 204, 208, or 212 of FIG. 2. The operations of the process 500 may be implemented as software components that are executed and run on one or more processors.

At block 502, the computing device (or component thereof) may receive, from a second sensing apparatus of the self-organizing network, an indication of a first task. The indication may be received via a transceiver using a networking protocol such as Bluetooth, UWB, Wi-Fi, etc. In some cases, the indication may be received from another sensing apparatus. In some cases, the first task may include at least one of sensing (e.g., via a sensor) an environment around the first sensing apparatus: sense a location of the sensing apparatus: collecting data received from at least one other sensing apparatus of the self-organizing network: processing data (e.g., via a processor) received from the at least one other sensing apparatus of the self-organizing network: or transmitting data (e.g., via a transceiver) to a server device, wherein the data is based on data received from the at least one other sensing apparatus of the self-organizing network. In some cases, the first task may include at least one of sensing (e.g., via a sensor) an environment around the first sensing apparatus and the computing device (or component thereof) may sense the environment around the first sensing apparatus to generate sensing data, wherein the environment around the sensing apparatus is the environment around an asset being tracked by the first sensing apparatus: and transmit (e.g., via a transceiver) the sensing data to another sensing apparatus for transmission to a server device. In some cases, the first task may include transmitting data (e.g., via a transceiver) received from at least one other sensing apparatus of the self-organizing network to a server device, and the computing device (or component thereof) may receive, from another sensing apparatus, sensing data: and transmit (e.g., via a transceiver) the sensing data to the server device.

At block 504, the computing device (or component thereof) may retrieve (e.g., by a processor), from the at least one memory, a first power profile associated with the first task. At block 506, the computing device (or component thereof) may determine (e.g., by a processor) a current battery level of the at least one battery.

At block 508, the computing device (or component thereof) may predict (e.g., by a processor) a future battery level of the at least one battery based on the current battery level, and the first power profile associated with the first task. In some cases, the computing device (or component thereof) may determine (e.g., by a processor) a duty cycle associated with the first task, and wherein the future battery level is further predicted based on the determined duty cycle of the first task. In some cases, the computing device (or component thereof) may perform a second task of sensing (e.g., via a sensor) an environment around the sensing apparatus, the second task associated with a second duty cycle: and retrieve, (e.g., by a processor) from the at least one memory, a second power profile associated with the second task, wherein the future battery level is further predicted (e.g., by a processor) based on the second power profile and second duty cycle.

At block 510, the computing device (or component thereof) may transmit (e.g., via a transceiver), to another sensing apparatus, the predicted future battery level. In some cases, the computing device (or component thereof) may receive (e.g., via a transceiver), from another sensing apparatus of a self-organizing network, an indication to perform a third task, wherein the third task comprises selecting a sensing apparatus to perform a fourth task. In some cases, the fourth task comprises determining (e.g., by a processor) a duty cycle for sensing an environment and the computing device (or component thereof) may obtain (e.g., by a processor) a manifest, the manifest indicating a set of sensing apparatuses and at least one sensing task associated with at least one sensing apparatus of the set of sensing apparatuses; receive (e.g., via a transceiver), from the at least one sensing apparatus from the set of sensing apparatuses, a predicted future battery level: determine (e.g., by a processor), based on the predicted future battery level and the at least one sensing task associated with the at least one sensing apparatus of the set of sensing apparatuses, a third duty cycle for a sensing task associated with the at least one sensing apparatus: and transmit (e.g., via a transceiver) an indication of the third duty cycle to the at least one sensing apparatus. In some cases, the manifest is preconfigured based on a location of the at least one sensing apparatus. In some cases, the computing device (or component thereof) may obtain location information (e.g., via a location sensor) associated with the set of sensing apparatuses, and wherein the third duty cycle is further determined (e.g., by a processor) based on the location information.

Figure 6:
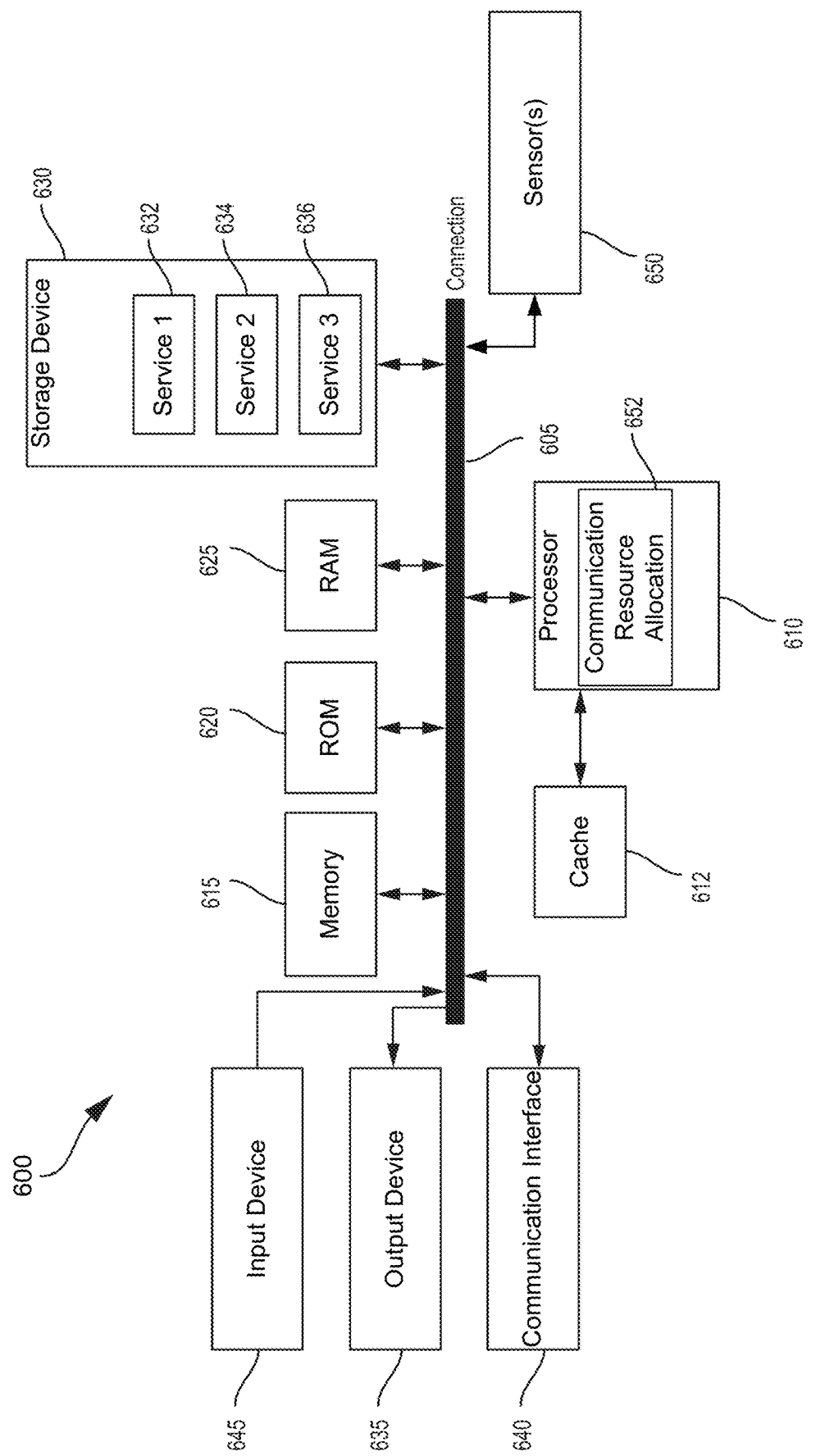
FIG. 6 illustrates an example computing device architecture of an example computing device which can implement the various techniques described herein.

FIG. 6 illustrates an example computing device architecture 600 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 600 may include SOC 100 of FIG. 1. The components of computing device architecture 600 are shown in electrical communication with each other using connection 605, such as a bus. The example computing device architecture 600 includes a processing unit (CPU or processor) 610 and computing device connection 605 that couples various computing device components including computing device memory 615, such as read only memory (ROM) 620 and random access memory (RAM) 625, to processor 610.

Computing device architecture 600 may include one or more sensors 650 coupled to the processor 610 via computing device connection 605. The sensor(s) 650 may include one or more of the sensors in the sensor(s) 650. For example, the sensor(s) 650 may include one or more environmental sensors and/or one or more sensors (e.g., the status sensor 270 and/or the PMO sensor 280, or one or more portions thereof) for providing one or more indications of one or more UE conditions.

Computing device architecture 600 can include a cache of high-speed memory connected directly with, in close proximity to, or integrated as part of processor 610. Computing device architecture 600 can copy data from memory 615 and/or the storage device 630 to cache 612 for quick access by processor 610. In this way, the cache can provide a performance boost that avoids processor 610 delays while waiting for data. These and other modules can control or be configured to control processor 610 to perform various actions. Other computing device memory 615 may be available for use as well. Memory 615 can include multiple different types of memory with different performance characteristics. Processor 610 can include any general purpose processor and a hardware or software service, such as service 1 632, service 2 634, and service 3 636 stored in storage device 630, configured to control processor 610 as well as a special-purpose processor where software instructions are incorporated into the processor design. Processor 610 may be a self-contained system, containing multiple cores or processors, a bus, memory controller, cache, etc. A multi-core processor may be symmetric or asymmetric.

The processor 610 may also include a communication resource allocation unit 652. The communication resource allocation unit 652 may be configured to allocate resources of the computing device architecture 600 for communication as discussed herein. The communication resource allocation unit 652 is discussed further below, and the description may refer to the processor 610 generally, or the computing device architecture 600 generally, as performing any of the functions of the functional unit 652.

The communication resource allocation unit 652 is configured to determine and control which resources to use for communication. The communication resource allocation unit 652 may be configured to use information from the sensor(s) 650, the location(s) of the sensor(s) in the computing device architecture 600, coverage area(s) of the sensor(s) 650 (e.g., a field of view of a camera), etc. to draw conclusions from the information provided by the sensor(s) 650 that may affect how the communication resource allocation unit 652 allocates one or more resources (e.g., (usage of) one or more components of the computing device architecture 600, energy used by the computing device architecture 600, etc.) for communication. The communication resource allocation unit 652 may, for example, determine directionality and/or power to use for communication transmission and/or reception, and/or may determine a quantity of antenna beams and/or a quantity of antennas to use for transmission and/or reception, and/or may determine processing effort (also referred to herein as processing level) (e.g., processing power, bandwidth, and/or time) for communication transmission and/or reception. The communication resource allocation unit 652 may, for example, save power by selectively transmitting and/or receiving with less than full bandwidth and/or by selectively reducing a message repetition (i.e., how many times that a message is repeatedly transmitted). The communication resource allocation unit 652 may use power and/or beam management to allocate communication resources, e.g., as discussed herein To enable user interaction with the computing device architecture 600, input device 645 can represent any number of input mechanisms, such as a microphone for speech, a touch-sensitive screen for gesture or graphical input, keyboard, mouse, motion input, speech and so forth. Output device 635 can also be one or more of a number of output mechanisms known to those of skill in the art, such as a display, projector, television, speaker device, etc. In some instances, multimodal computing devices can enable a user to provide multiple types of input to communicate with computing device architecture 600. Communication interface 640) can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. Storage device 630 can include services 632, 634, 636 for controlling processor 610. Other hardware or software modules are contemplated. Storage device 630 can be connected to the computing device connection 605. In one aspect, a hardware module that performs a particular function can include the software component stored in a computer-readable medium in connection with the necessary hardware components, such as processor 610, connection 605, output device 635, and so forth, to carry out the function.

In some cases, the computing device architecture 600 may be a user equipment (UE) that may couple to a wireless communications system.

Figure 7:
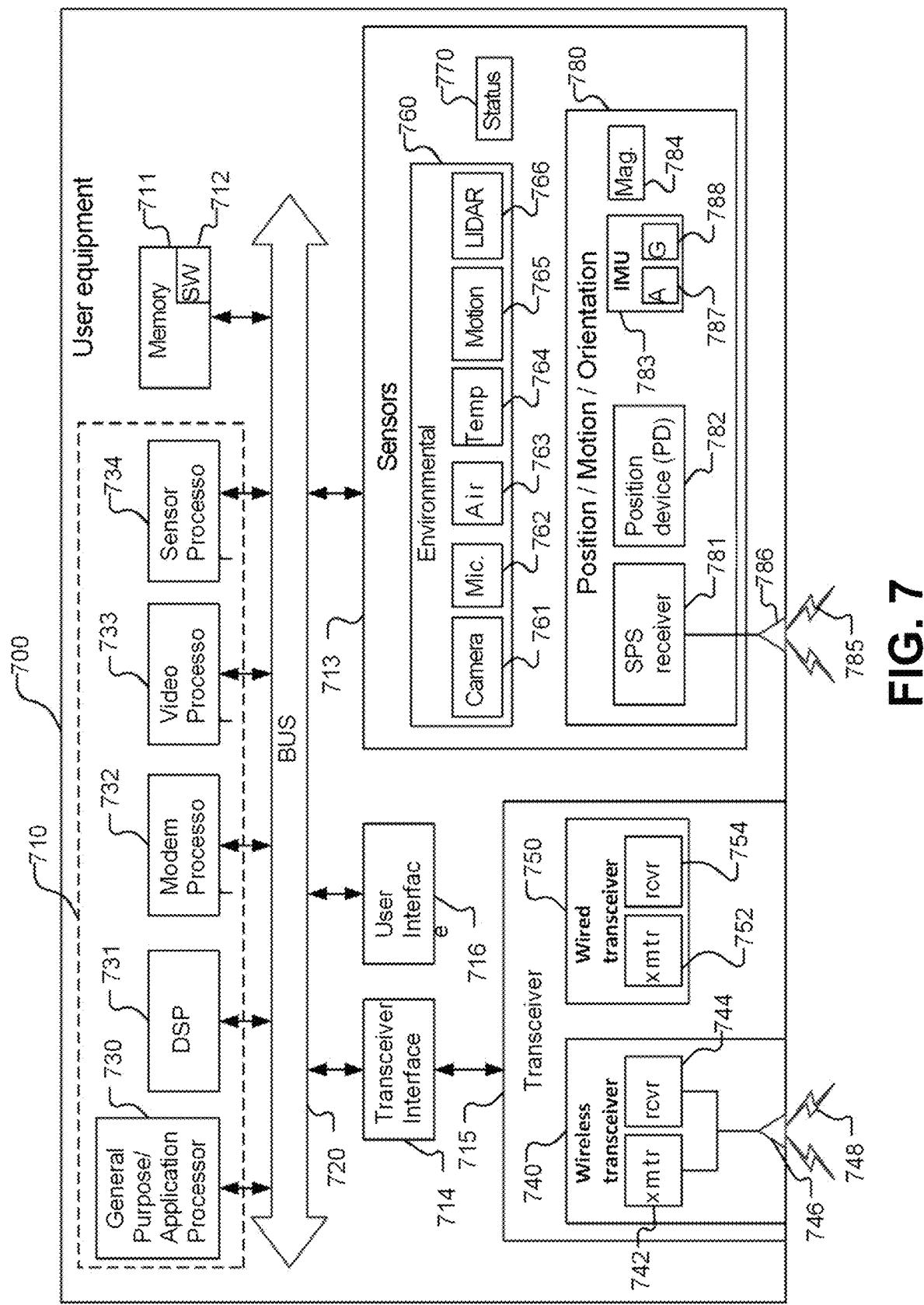
FIG. 7 is a block diagram of a UE, in accordance with aspects of the present disclosure.

FIG. 7 is a block diagram of a UE 700, in accordance with aspects of the present disclosure. UE 700 may be an example of any of the UEs 812, 813, 814 (as shown below in FIG. 8) and comprises a computing platform including a processor 710, memory 711 including software (SW) 712, one or more sensors 713, a transceiver interface 714 for a transceiver 715 (that includes a wireless transceiver 740 and a wired transceiver 750), and a user interface 716. The processor 710, the memory 711, the sensor(s) 713, the transceiver interface 714, and the user interface 716 may be communicatively coupled to each other by a bus 720 (which may be configured, e.g., for optical and/or electrical communication). One or more of the components shown (e.g., one or more of the sensors 713, etc.) may be omitted from the UE 700.

The processor 710 may include one or more intelligent hardware devices, e.g., a central processing unit (CPU), a microcontroller, an application specific integrated circuit (ASIC), etc. The processor 710 may comprise multiple processors including a general-purpose/application processor 730, a Digital Signal Processor (DSP) 731, a modem processor 732, a video processor 733, and/or a sensor processor 734. One or more of the processors 730-734 may comprise multiple devices (e.g., multiple processors). For example, the sensor processor 734 may comprise, e.g., processors for radar, ultrasound, and/or lidar, etc. The modem processor 732 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 700 for connectivity. The memory 711 is a non-transitory storage medium that may include random access memory (RAM), flash memory, disc memory, and/or read-only memory (ROM), etc. The memory 711 stores the software 712 which may be processor-readable, processor-executable software code containing instructions that are configured to, when executed, cause the processor 710 to perform various functions described herein. Alternatively, the software 712 may not be directly executable by the processor 710 but may be configured to cause the processor 710, e.g., when compiled and executed, to perform the functions. The description may refer only to the processor 710 performing a function, but this includes other implementations such as where the processor 710 executes software and/or firmware. The description may refer to the processor 710 performing a function as shorthand for one or more of the processors 730-734 performing the function. The description may refer to the UE 700 performing a function as shorthand for one or more appropriate components of the UE 700 performing the function. The processor 710 may include a memory with stored instructions in addition to and/or instead of the memory 711. Functionality of the processor 710 is discussed more fully below.

The configuration of the UE 700 shown in FIG. 7 is an example and not limiting of the aspects and features of the disclosure, including the claims, and other configurations may be used. For example, an example configuration of the UE includes one or more of the processors 730-734 of the processor 710, the memory 711, and the wireless transceiver 740. Other example configurations include one or more of the processors 730-734 of the processor 710, the memory 711, the wireless transceiver 740, and one or more of the sensors 713, the user interface 716, and/or the wired transceiver 750.

The UE 700 may comprise the modem processor 732 that may be capable of performing baseband processing of signals received and down-converted by the transceiver 715 and/or the SPS receiver 781 (discussed below). The modem processor 732 may perform baseband processing of signals to be upconverted for transmission by the transceiver 715. Also or alternatively, baseband processing may be performed by the processor 730 and/or the DSP 731. Other configurations, however, may be used to perform baseband processing.

The UE 700 includes the sensors 713 that may include one or more of various types of sensors, for example, an environmental sensor 760, a status sensor 770, and a position/motion/orientation (PMO) sensor 780. The PMO sensor 780 may include one or more sensors from which position and/or motion and/or orientation of the UE 700 may be determined. While each of the sensors 760, 770, 780 may be referred to in the singular, each of the sensors 760, 770, 780 may include more than one sensor, examples of some of which are discussed explicitly herein. The sensors 713 may generate analog and/or digital signals indications of which may be stored in the memory 711 and processed by the processor 710 (e.g., the processor 730, the DSP 731, the video processor 733, and/or the sensor processor 734 as appropriate) in support of one or more applications such as, for example, applications directed to positioning, navigation, and/or resource management. The description herein may refer to the processor 710 generally as performing one or more functions that one or more of the processors 730-734 perform.

The sensor(s) 713 may be used in resource management, relative location measurements, relative location determination, motion determination, etc. Information detected by the sensor(s) 713 may be used to determine how to allocate resources of the UE 700, e.g., transmission power, processing power for transmission and/or reception of communication signals, transmission and/or reception directionality, etc. The plural term "resources" is often used throughout the discussion herein, but this term includes the singular as well, i.e., a single resource, e.g., being allocated. Also or alternatively, information detected by the sensor(s) may be used for motion detection, relative displacement, dead reckoning, sensor-based location determination, and/or sensor-assisted location determination. The sensor(s) 713 may be useful to determine whether the UE 700 is fixed (stationary) or mobile and/or whether to report certain useful information to the server 143 regarding the mobility of the UE 700. For example, based on the information obtained/measured by the sensor(s) 713, the UE 700 may notify/report to the server 843 of FIG. 8 that the UE 700 has detected movements or that the UE 700 has moved, and report the relative displacement/distance (e.g., via dead reckoning, or sensor-based location determination, or sensor-assisted location determination enabled by the sensor(s) 713). In another example, for relative positioning information, the sensors/IMU can be used to determine the angle, size (e.g., width and/or height), and/or orientation of another device with respect to the UE 700, etc. The position and/or motion of the UE 700 may be used in determining resource allocation for communication, e.g., between vehicles. The UE 700 may, for example, be disposed in or integrated with a vehicle. For example, the UE 700 may be the UE 814 of FIG. 8 that is a vehicle, in the example shown in FIG. 8, a car, although other forms of vehicles may be used, e.g., trucks, aerial UEs such as drones, etc. As such, the UE 700 may be configured for various forms of communication, e.g., V2V (vehicle-to-vehicle), V2X (vehicle-to-everything), CV2X (cellular V2X), CV2V (cellular V2V), etc.

The environmental sensor 760 may include one or more sensors for measuring one or more internal and/or external environmental conditions. In this example, the environmental sensor 760 includes a camera 761, a microphone 762, an air-flow sensor 763, a temperature sensor 764, a motion sensor 765, and a LIDAR (Light Detection and Ranging) sensor 766. While each of the sensors 761-766 may be referred to in the singular, each of the sensors 761-766 may include more than one sensor, examples of some of which are discussed explicitly herein. For example, the camera 761 may include at least one camera configured (e.g., designed, made, disposed, and directed) to capture images external to the UE 700 and/or may include one or more cameras configured to capture images internal to the UE 700 (e.g., in a passenger compartment of a vehicle). As other examples, the microphone 762, the temperature sensor 764, and/or the motion sensor 765 may include multiple microphones, multiple thermometers, and/or multiple motion detectors configured to detect sound, temperature, and/or motion (respectively) outside and/or inside of the UE 700, e.g., a vehicle. Indeed, any of the sensors 761-765 may include multiple respective sensors outside the vehicle and/or multiple respective sensors inside the vehicle for making respective measurements at multiple locations about the vehicle and/or in different directions relative to the vehicle. While this discussion assumes the UE 700 is a vehicle, the UE 700 may be a different device (i.e., other than a vehicle). The sensors 761-765 are examples and one or more of the sensors 761-765 may be omitted from the UE 700 and/or one or more other sensors may be included in the UE 700. For example, the environmental sensor 760 may include one or more barometric pressure sensors and/or one or more ambient light sensors and/or one or more other sensors.

The camera 761 may be configured for capturing still and/or moving imagery. For example, each camera of the camera 761 may comprise, for example, one or more imaging sensors (e.g., a charge coupled device (CCD) or a CMOS imager), one or more lenses, analog-to-digital circuitry, frame buffers, etc. Additional processing, conditioning, encoding, and/or compression of signals representing captured images may be performed by the general-purpose processor 730 and/or the DSP 731. Also or alternatively, the video processor 733 may perform conditioning, encoding, compression, and/or manipulation of signals representing captured images. The video processor 733 may decode/decompress stored image data for presentation on a display device (not shown), e.g., of the user interface 716.

The motion detector 765 is configured to detect motion. For example, the motion detector 765 may send and receive sound waves (e.g., ultrasound signals) and analyze the received signals for Doppler effects indicative of motion. Use of multiple motion detectors may help identify the relative location (e.g., direction relative to the UE 700) of an object.

The LIDAR sensor 766 is configured to determine range to an object, which may be used by the processor 710 to detect the presence of an object. Use of multiple LIDAR sensors may help identify the relative location (e.g., direction relative to the UE 700) of an object. The LIDAR sensor 766 may be called a LADAR (laser radar) sensor, as is common when using a LIDAR sensor for detecting relatively small objects such as vehicles or other artificial (human-made) objects.

The status sensor 770 is configured to provide one or more indications of one or more UE conditions of the UE 700 indicative of UE status. For example, UE conditions where the UE 700 is a vehicle (with UE conditions thus being vehicle conditions) may include a gear status of the vehicle (e.g., whether the vehicle is in park, drive, or neutral, or in which gear the vehicle is presently (e.g., reverse, first, second, third, fourth, etc.)). Another vehicle condition may be whether an emergency brake is engaged. Another vehicle condition may be whether a main brake is presently engaged and possibly engaged to what degree. Another vehicle condition may be whether an accelerator is presently engaged and possibly to what degree. Another vehicle condition may be the status of the steering wheel (e.g., turned which way and how much) and/or wheel(s) directing the vehicle (e.g., direction of front wheels). Other example vehicle conditions may include whether a right-turn indicator is actuated, whether a left-turn indicator is actuated, and/or whether hazard lights (also called "four ways" or emergency flashers, etc.) are actuated. Another example vehicle condition may include tire status (e.g., tire pressure, rate of tire pressure change (e.g., to indicate a flat or blowout)). Another example vehicle condition is speed, e.g., as registered by a speedometer of the vehicle and/or determined by other means (e.g., using the PMO sensor 780). These vehicle conditions are examples, and one or more other sensors may be provided to sense one or more other vehicle conditions. Further, numerous other UE conditions may be sensed and indicated where the UE 700 is not a vehicle or is not associated with a vehicle.

The PMO sensor 780 may include one or more sensors for providing one or more UE conditions such as, for example, vehicle conditions. For example, the PMO sensor 780 may include one or more sensors for measuring information from which position and/or motion and/or orientation of the UE 700 may be determined and possibly determining position and/or motion (e.g., speed and/or direction of motion) and/or orientation of the UE 700. In this example, the PMO sensor 780 includes a Satellite Positioning System (SPS) receiver 781, a position device (PD) 782, an Inertial Measurement Unit (IMU) 783, and a magnetometer 784. The components of the PMO sensor 780 shown are examples, and one or more of these components may be omitted and/or one or more other components included in the PMO sensor 780. Also, while each of the components 781-784 of the PMO sensor 780 may be referred to in the singular, each of the components 781-784 may include more than one such component, examples of some of which are discussed explicitly herein. Also, the PD 782 may be part of the SPS receiver 781 and/or the IMU 783 and/or part of the processor 710, and may not be a sensor itself (e.g., may not take measurements), but may process information from one or more of the sensors 781, 783, 784 and/or one or more other sensors. The PMO 780 may be used to determine UE speed and/or direction of motion, e.g., by determining UE location over time (e.g., determined using SPS, one or more ranging sensors, etc.).

The IMU 783 may comprise one or more inertial sensors, for example, an accelerometer 787 (e.g., responding to acceleration of the UE 700 in three dimensions) and/or a gyroscope 788. While each of the sensors 787, 788 may be referred to in the singular, each of the sensors 787, 788 may include more than one sensor. The accelerometer may include one or more three-dimensional accelerometers and the gyroscope may include one or more three-dimensional gyroscopes. The IMU 783 may be configured to provide measurements about a direction of motion and/or a speed of motion of the UE 700, which may be used, for example, in relative location determination. For example, the accelerometer 787 and/or the gyroscope 788 of the IMU 783 may detect, respectively, a linear acceleration and a speed of rotation of the UE 700. The linear acceleration and speed of rotation measurements of the UE 700 may be integrated over time (e.g., by the IMU 783 and/or the PD 782) to determine an instantaneous direction of motion as well as a displacement of the UE 700. The instantaneous direction of motion and the displacement may be integrated to track a location of the UE 700. For example, a reference location of the UE 700 may be determined, e.g., using the SPS receiver 781 (and/or by some other means) for a moment in time and measurements from the accelerometer 787 and the gyroscope 788 taken after this moment in time may be used in dead reckoning to determine a present location of the UE 700 based on movement (direction and distance) of the UE 700 relative to the reference location.

The magnetometer 784 may determine magnetic field strengths in different directions which may be used to determine orientation of the UE 700, which may be used, for example, to provide a digital compass for the UE 700. The magnetometer 784 may include a two-dimensional magnetometer configured to detect and provide indications of magnetic field strength in two orthogonal dimensions. Also or alternatively, the magnetometer 784 may include a three-dimensional magnetometer configured to detect and provide indications of magnetic field strength in three orthogonal dimensions. The magnetometer 784 may provide means for sensing a magnetic field and providing indications of the magnetic field, e.g., to the processor 710. The magnetometer 784 may provide measurements to determine orientation (e.g., relative to magnetic north and/or true north) that may be used for any of a variety of purposes, e.g., to support one or more compass applications. While referred to in the singular, the magnetometer 784 may include multiple magnetometers.

The SPS receiver 781 (e.g., a Global Positioning System (GPS) receiver or other Global Navigation Satellite System (GNSS) receiver) may be capable of receiving and acquiring SPS signals 785 via an SPS antenna 786. The antenna 786 is configured to transduce the wireless SPS signals 785 to wired signals, e.g., electrical or optical signals, and may be integrated with the antenna 746. The SPS receiver 781 may be configured to process, in whole or in part, the acquired SPS signals 785 for estimating a location of the UE 700. For example, the SPS receiver 781 may be configured to determine location of the UE 700 by trilateration using the SPS signals 785. The general-purpose processor 730, the memory 711, the DSP 731 and/or one or more specialized processors (not shown) may be utilized to process acquired SPS signals, in whole or in part, and/or to calculate an estimated location of the UE 700, in conjunction with the SPS receiver 781. The memory 711 may store indications (e.g., measurements) of the SPS signals 785 and/or other signals (e.g., signals acquired from the wireless transceiver 740) for use in performing positioning operations. The general-purpose processor 730, the DSP 731, and/or one or more specialized processors, and/or the memory 711 may provide or support a location engine for use in processing measurements to estimate a location of the UE 700. Also or alternatively, some or all of the position determination signal processing may be performed by the PD 782.

The position device (PD) 782 may be configured to determine a position of the UE 700 (including absolute and/or relative position of the UE 700), motion of the UE 700, and/or time. For example, the PD 782 may communicate with, and/or include some or all of, the SPS receiver 781. The PD 782 may use measurements from the SPS receiver 781 and/or the IMU 783 and/or the magnetometer 784 to determine position and/or motion of the UE 700, e.g., using trilateration and/or dead reckoning. The PD 782 may work in conjunction with the processor 710 and the memory 711 as appropriate to perform at least a portion of one or more positioning methods (to determine location of the UE 700), although the description herein may refer only to the PD 782 being configured to perform, or performing, one or more operations in accordance with the positioning method(s). The PD 782 may also or alternatively be configured to determine location of the UE 700 using terrestrial-based signals (e.g., at least some of signals 748 discussed below) for trilateration, for assistance with obtaining and using the SPS signals 785, or both. The PD 782 may be configured to use one or more other techniques (e.g., relying on the UE's self-reported location (e.g., part of the UE's position beacon)) for determining the location of the UE 700, and may use a combination of techniques (e.g., SPS and terrestrial positioning signals) to determine the location of the UE 700. The PD 782 may be configured to provide indications of uncertainty and/or error in the determined position and/or motion. Functionality of the PD 782 may be provided in a variety of manners and/or configurations, e.g., by the general purpose/application processor 730, the transceiver 715, the SPS receiver 781, and/or another component of the UE 700, and may be provided by hardware, software, firmware, or various combinations thereof.

The transceiver 715 may include a wireless transceiver 740 and/or a wired transceiver 750 configured to communicate with other devices through wireless connections and wired connections, respectively. For example, the wireless transceiver 740 may include a wireless transmitter 742 and a wireless receiver 744 coupled to one or more antennas 746 for transmitting (e.g., on one or more uplink channels and/or one or more sidelink channels) and/or receiving (e.g., on one or more downlink channels and/or one or more sidelink channels) wireless signals 748 and transducing signals from the wireless signals 748 to wired (e.g., electrical and/or optical) signals and from wired signals to the wireless signals 748. The wireless transceiver 740 may be configured for wireless communication to send communications to, and receive communications from, a variety of entities such as other UEs, base stations, etc. Thus, the wireless transmitter 742 may include multiple transmitters that may be discrete components or combined/integrated components, and/or the wireless receiver 744 may include multiple receivers that may be discrete components or combined/integrated components. The wireless transceiver 740 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 750 may include a wired transmitter 752 and a wired receiver 754 configured for wired communication, e.g., a network interface that may communicate with the network 830 of FIG. 8, e.g., to send communications to, and receive communications from, a gNB, for example. The wired transmitter 752 may include multiple transmitters that may be discrete components or combined/integrated components, and/or the wired receiver 754 may include multiple receivers that may be discrete components or combined/integrated components. The wired transceiver 750 may be configured, e.g., for optical communication and/or electrical communication. The transceiver 715 may be communicatively coupled to the transceiver interface 714, e.g., by optical and/or electrical connection. The transceiver interface 714 may be at least partially integrated with the transceiver 715.

The wireless transceiver 740 may be configured for beam management to affect directionality of the wireless transceiver 740, e.g., of the antenna 746. For example, the wireless transceiver 740 may be configured to implement beam forming for transmission and/or reception of the signals 748. The antenna 746 may include multiple antennas that are configured, e.g., designed, made, disposed, and directed to point in different directions relative to a body of the UE 700. One or more of such antennas may be capable of electronic beam steering (e.g., using appropriate phase shifts of elements of the antenna) and/or mechanical beam steering. Also or alternatively, the transceiver 740 may be configured to selectively (e.g., under direction/control of the processor 710) transmit from one or more antennas and/or to selectively process signals (e.g., to pass from the transceiver 715 to the processor 710 or to process by the processor 710) received from one or more antennas.

The user interface 716 may comprise one or more of several devices such as, for example, a speaker, microphone, display device, vibration device, keyboard, touch screen, etc. The user interface 716 may include more than one of any of these devices. The user interface 716 may be configured to enable a user to interact with one or more applications hosted by the UE 700. For example, the user interface 716 may store indications of analog and/or digital signals in the memory 711 to be processed by DSP 731 and/or the general-purpose processor 730) in response to action from a user. Similarly, applications hosted on the UE 700 may store indications of analog and/or digital signals in the memory 711 to present an output signal to a user. The user interface 716 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 716 may comprise one or more touch sensors responsive to touching and/or pressure, e.g., on a keyboard and/or touch screen of the user interface 716.

Figure 8:
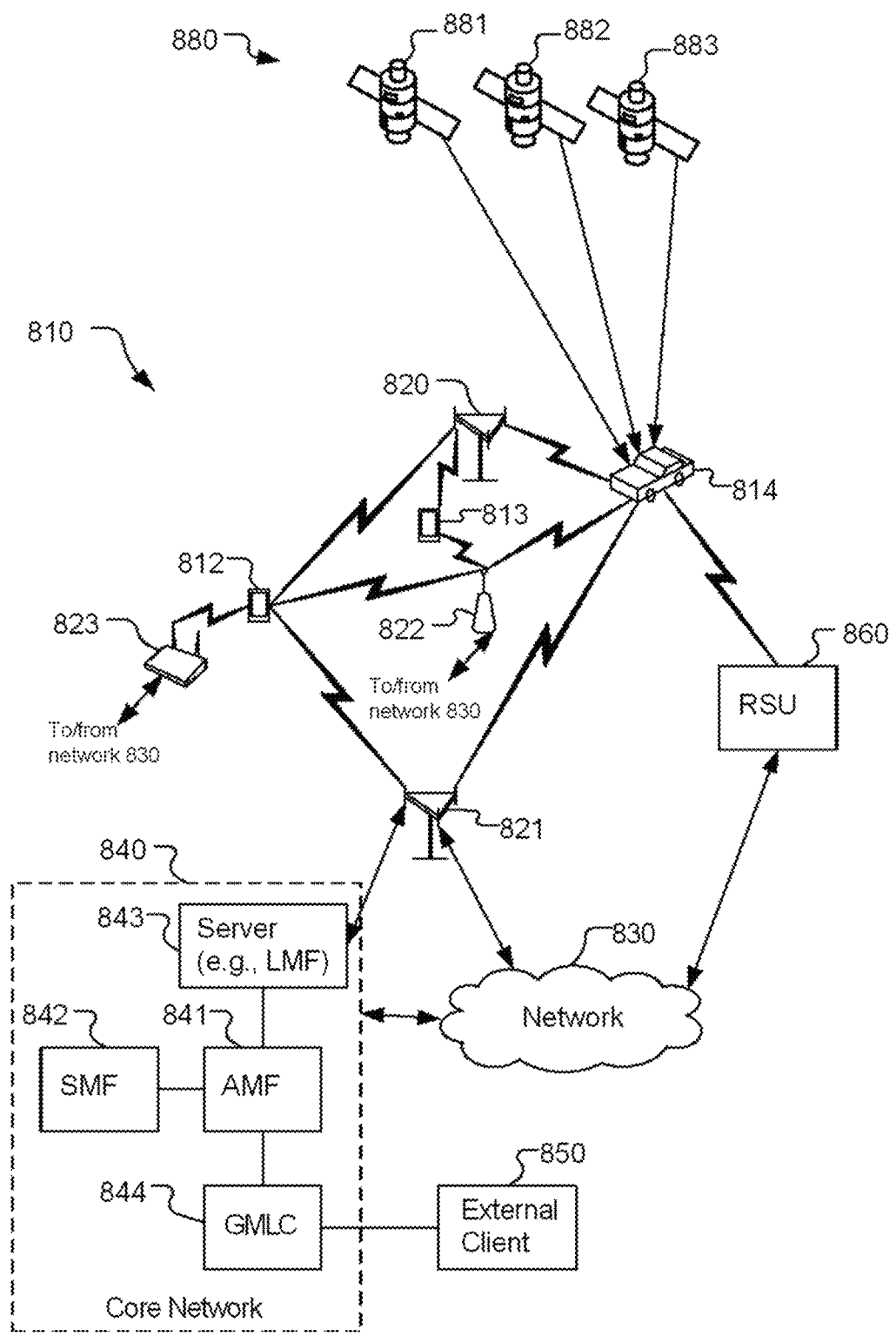
FIG. 8 illustrates an example wireless communications system, in accordance with aspects of the present disclosure.

FIG. 8 illustrates an example wireless communications system 810, in accordance with aspects of the present disclosure. Wireless communications system 810 includes a user equipment (UE) 812, a UE 813, a UE 814, base transceiver stations (BTSs) 820, 821, 822, 823, a network 830, a core network 840, an external client 850, and a roadside unit (RSU) 860. The core network 840 (e.g., a 5G core network (5GC)) may include back-end devices including, among other things, an Access and Mobility Management Function (AMF) 841, a Session Management Function (SMF) 842, a server 843, and a Gateway Mobile Location Center (GMLC) 844. The AMF 841, the SMF 842, the server 843, and the GMLC 844 are communicatively coupled to each other. The server 843 may be, for example, a Location Management Function (LMF) that supports positioning of the UEs 812-814 (e.g., using techniques such as Assisted Global Navigation Satellite System (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.). The RSU 860 may be configured for communication (e.g., bi-directional or uni-directional communication) with the UEs 812-814). For example, the RSU 860 may be configured with similar communication capabilities to any of the BTSs 820-823, but perhaps with different functionality(ies) (e.g., different programming). Also, while one RSU 860 is shown in FIG. 8, the system 800 may include more than one RSU, or may not include any RSUs. The communication system 810 may include additional or alternative components.

The communication system 810 may utilize information from a constellation 880 of satellite vehicles (SVs) 881, 882, 883. The constellation 880 may correspond to a respective Global Navigation Satellite System (GNSS) (i.e., Satellite Positioning System (SPS)) such as the Global Positioning System (GPS), the GLObal NAvigation Satellite System (GLONASS), Galileo, Beidou, or some other local or regional SPS such as the Indian Regional Navigational Satellite System (IRNSS), the European Geostationary Navigation Overlay Service (EGNOS), or the Wide Area Augmentation System (WAAS). Only three SVs are shown for the constellation 880, but constellations of GNSS SVs will include more than three SVs.

An LMF may also be referred to as a Location Manager (LM), a Location Function (LF), a commercial LMF (CLMF), or a value-added LMF (VLMF). The server 843 (e.g., an LMF) and/or one or more other devices of the system 810 (e.g., one or more of the UEs 812-814) may be configured to determine locations of the UEs 812-814. The server 843 may communicate directly with the BTS 821 (e.g., a gNB) and/or one or more other BTSs, and may be integrated with the BTS 821 and/or one or more other BTSs. The SMF 842 may serve as an initial contact point of a Service Control Function (SCF) (not shown) to create, control, and delete media sessions. The server 843 (e.g., an LMF) may be co-located or integrated with a gNB or a TRP (Transmission/Reception Point), or may be disposed remote from the gNB and/or TRP and configured to communicate directly or indirectly with the gNB and/or the TRP.

The AMF 841 may serve as a control node that processes signaling between the UEs 812-814 and the core network 840, and provides QoS (Quality of Service) flow and session management. The AMF 841 may support mobility of the UEs 812-814 including cell change and handover and may participate in supporting signaling connection to the UEs 812-814.

The system 810 is capable of wireless communication in that components of the system 810 can communicate with one another (at least some times using wireless connections) directly or indirectly, e.g., via the BTSs 820-823 and/or the network 830 (and/or one or more other devices not shown, such as one or more other base transceiver stations). While the BTSs 820-823 are shown separately from the network 830, the network 830 may include one or more of the BTSs 820-823 and may constitute a Radio Access Network (RAN), e.g., a New Radio (NR) RAN which may also be called a Fifth Generation (5G) Next Generation (NG) RAN (NG-RAN). For indirect communications, the communications may be altered during transmission from one entity to another, e.g., to alter header information of data packets, to change format, etc. The UEs 812-814 may communicate with the BTSs 820-823 via Uu interfaces, e.g., in RRC-encapsulated LPP messages (Radio Resource Control encapsulated LTE Positioning Protocol messages) over Uu interfaces. The UEs 812-814 shown are a smartphone, a tablet computer, and a vehicle-based device, but these are examples only as the UEs 812-814 are not required to be any of these configurations, and other configurations of UEs may be used. The UEs 812-814, the BTSs 820-823, the network 830, the core network 840, and/or the external client 850. For example, such other devices may include internet of thing (IoT) devices, medical devices, home entertainment and/or automation devices, etc. The core network 840) may communicate with the external client 850 (e.g., a computer system), e.g., to allow the external client 850 to request and/or receive location information regarding the UEs 812-814 (e.g., via the GMLC 844).

The UEs 812-814 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.81p, etc.). V2X communications may be cellular (Cellular-V2X (C-V2X)) and/or WiFi (e.g., DSRC (Dedicated Short-Range Connection)). The system 810 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 820-823 may wirelessly communicate with the UEs 812-814 in the system 810 via one or more antennas. A BTS may also be referred to as a base station, an access point, agNode B (gNB), an access node (AN), a Node B, an evolved Node B (eNB), etc. For example, each of the BTSs 820, 821 may be a gNB or a transmission point gNB, the BTS 822 may be a macro cell (e.g., a high-power cellular base station) and/or a small cell (e.g., a low-power cellular base station), and the BTS 823 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 820-823 may be configured to communicate with the UEs 812-814 via multiple carriers. Each of the BTSs 820, 821 may provide communication coverage for a respective geographic region, e.g. a cell. Each cell may be partitioned into multiple sectors as a function of the base station antennas.

The BTSs 820-823 each comprise one or more Transmission/Reception Points (TRPs). For example, each sector within a cell of a BTS may comprise a TRP, although multiple TRPs may share one or more components (e.g., share a processor but have separate antennas). The system 810 may include only macro TRPs or the system 810 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 812-814 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, Ultrawideband (UWB), and so on. One or more of a group of the UEs 812-814 utilizing D2D communications may be within a geographic coverage area of a TRP such as one or more of the BTSs 820-823. Other UEs in such a group may be outside such geographic coverage areas, or be otherwise unable to receive transmissions from a base station. Groups of the UEs 812-814 communicating via D2D communications may utilize a one-to-many (8:M) system in which each UE may transmit to other UEs in the group. A TRP of the BTSs 820-823 may facilitate scheduling of resources for D2D communications. In other cases, D2D communications may be carried out between UEs without the involvement of a TRP.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A first sensing apparatus of a self-organizing network, comprising: at least one battery: at least one memory comprising instructions: and at least one processor coupled to the at least one memory and configured to: receive, from a second sensing apparatus of the self-organizing network, an indication of a first task: retrieve, from the at least one memory, a first power profile associated with the first task: determine a current battery level of the at least one battery: predict a future battery level of the at least one battery based on the current battery level, and the first power profile associated with the first task: and transmit, to another sensing apparatus, the predicted future battery level.

Aspect 2. The first sensing apparatus of Aspect 1, wherein the at least one processor is further configured to: determine a duty cycle associated with the first task, and wherein the future battery level is further predicted based on the determined duty cycle of the first task.

Aspect 3. The first sensing apparatus of any one of Aspects 1 or 2, wherein the first task comprises at least one of: sensing an environment around the sensing apparatus: sensing a location of the sensing apparatus: collecting data received from at least one other sensing apparatus of the self-organizing network: processing data received from the at least one other sensing apparatus of the self-organizing network: or transmitting data to a server device, wherein the data is based on data received from the at least one other sensing apparatus of the self-organizing network.

Aspect 4. The first sensing apparatus of any one of Aspects 1 to 3, wherein the first task comprises sensing an environment around the first sensing apparatus, and wherein the at least one processor is further configured to: sense the environment around the first sensing apparatus to generate sensing data, wherein the environment around the first sensing apparatus is the environment around an asset being tracked by the first sensing apparatus: and transmit the sensing data to another sensing apparatus for transmission to a server device.

Aspect 5. The first sensing apparatus of any one of Aspects 1 to 4, wherein the first task comprises transmitting data received from at least one other sensing apparatus of the self-organizing network to a server device, and wherein the at least one processor is further configured to: receive, from another sensing apparatus, sensing data: and transmit the sensing data to the server device.

Aspect 6. The first sensing apparatus of any one of Aspects 1 to 5, wherein the at least one processor is further configured to: perform a second task, wherein the second task is different from the first task: and retrieve, from the at least one memory, a second power profile associated with the second task, wherein the future battery level is further predicted based on the second power profile.

Aspect 7. The first sensing apparatus of Aspect 6, wherein the second task comprises sensing an environment around the sensing apparatus.

Aspect 8. The first sensing apparatus of any one of Aspects 1 to 7, wherein the at least one processor is further configured to: obtain information indicating a set of sensing apparatuses and at least one sensing task associated with at least one sensing apparatus of the set of sensing apparatuses: and receive, from the at least one sensing apparatus from the set of sensing apparatuses, a predicted future battery level.

Aspect 9. The first sensing apparatus of Aspect 8, wherein the information indicating the set of sensing apparatuses is preconfigured based on a location of the at least one sensing apparatus.

Aspect 10. The first sensing apparatus of any one of Aspects 8 or 9, wherein the at least one processor is further configured to receive, from another sensing apparatus of the self-organizing network, an indication to perform a second task, wherein the second task comprises selecting a sensing apparatus to perform a third task.

Aspect 11. The first sensing apparatus of Aspect 10, wherein the third task comprises determining a duty cycle for sensing an environment, and wherein the at least one processor is further configured to: determine, based on the predicted future battery level and the at least one sensing task associated with the at least one sensing apparatus of the set of sensing apparatuses, a duty cycle for a sensing task associated with the at least one sensing apparatus; and transmit an indication of the duty cycle to the at least one sensing apparatus.

Aspect 12. The first sensing apparatus of Aspect 11, wherein the at least one processor is further configured to obtain location information associated with the set of sensing apparatuses, and wherein the duty cycle is further determined based on the location information.

Aspect 13. The first sensing apparatus of any one of Aspects 1 to 12, wherein the first sensing apparatus includes a transceiver for transmitting and receiving information.

Aspect 14. A method for network organization at a first sensing apparatus of a self-organizing network, the method comprising: receiving, from a second sensing apparatus of the self-organizing network, an indication of a first task: retrieving a first power profile associated with the first task: determining a current battery level of at least one battery: predicting a future battery level of the at least one battery based on the current battery level, and the first power profile associated with the first task: and transmitting, to another sensing apparatus, the predicted future battery level.

Aspect 15. The method of Aspect 14, further comprising: determining a duty cycle associated with the first task, and wherein the future battery level is further predicted based on the determined duty cycle of the first task.

Aspect 16. The method of any one of Aspects 14 or 15, wherein the first task comprises at least one of: sensing an environment around the sensing apparatus: sensing a location of the sensing apparatus: collecting data received from at least one other sensing apparatus of the self-organizing network: processing data received from the at least one other sensing apparatus of the self-organizing network: or transmitting processed data to a server device, wherein the data is based on data received from the at least one other sensing apparatus of the self-organizing network to a server device.

Aspect 17. The method of any one of Aspects 14 to 16, wherein the first task comprises sensing an environment around the first sensing apparatus, and further comprising: sensing the environment around the first sensing apparatus to generate sensing data, wherein the environment around the sensing apparatus is the environment around an asset being tracked by the first sensing apparatus: and transmitting the sensing data to another sensing apparatus for transmission to a server device.

Aspect 18. The method of any one of Aspects 14 to 17, wherein the first task comprises transmitting data received from at least one other sensing apparatus of the self-organizing network to a server device, and the method further comprising: receiving, from another sensing apparatus, sensing data: and transmitting the sensing data to the server device.

Aspect 19. The method of any one of Aspects 14 to 18, further comprising: performing a second task, wherein the second task is different from the first task: and retrieving a second power profile associated with the second task, wherein the future battery level is further predicted based on the second power profile.

Aspect 20. The method of Aspect 19, wherein the second task comprises sensing an environment around the sensing apparatus.

Aspect 21. The method of any one of Aspects 14 to 20, further comprising: obtaining information indicating a set of sensing apparatuses and at least one sensing task associated with at least one sensing apparatus of the set of sensing apparatuses: and receiving, from the at least one sensing apparatus from the set of sensing apparatuses, a predicted future battery level.

Aspect 22. The method of Aspect 21, wherein the information indicating the set of sensing apparatuses is preconfigured based on a location of the at least one sensing apparatus.

Aspect 23. The method of any one of Aspects 21 or 22, further comprising receiving, from another sensing apparatus of a self-organizing network, an indication to perform a second task, wherein the second task comprises selecting a sensing apparatus to perform a third task.

Aspect 24. The method of Aspect 23, wherein the third task comprises determining a duty cycle for sensing an environment, the method further comprising: determining, based on the predicted future battery level and the at least one sensing task associated with the at least one sensing apparatus of the set of sensing apparatuses, a duty cycle for a sensing task associated with the at least one sensing apparatus: and transmitting an indication of the duty cycle to the at least one sensing apparatus.

Aspect 25. The method of Aspect 24, further comprising obtaining location information associated with the set of sensing apparatuses, and wherein the duty cycle is further determined based on the location information.

Aspect 26. A non-transitory computer-readable medium of a first sensing apparatus of a self-organizing network, the non-transitory computer-readable medium having stored thereon instructions that, when executed by at least one processor, cause the at least one processor to: receive, from a second sensing apparatus of the self-organizing network, an indication of a first task: retrieve a first power profile associated with the first task: determine a current battery level of at least one battery: predict a future battery level of the at least one battery based on the current battery level, and the first power profile associated with the first task: and transmit, to another sensing apparatus, the predicted future battery level.

Aspect 27. The non-transitory computer-readable medium of Aspect 26, wherein the instructions further cause the at least one processor to: determine a duty cycle associated with the first task, and wherein the future battery level is further predicted based on the determined duty cycle of the first task.

Aspect 28. The non-transitory computer-readable medium of any one of Aspects 26 or 27, wherein the first task comprises at least one of: sense an environment around the sensing apparatus: sense a location of the sensing apparatus: collect data received from at least one other sensing apparatus of the self-organizing network: process data received from the at least one other sensing apparatus of the self-organizing network: or transmit data to a server device, wherein the data is based on data received from the at least one other sensing apparatus of the self-organizing network.

Aspect 29. The non-transitory computer-readable medium of any one of Aspects 26 to 28, wherein the first task comprises sensing an environment around the first sensing apparatus, and wherein the instructions further cause the at least one processor to: sense the environment around the first sensing apparatus to generate sensing data, wherein the environment around the sensing apparatus is the environment around an asset being tracked by the first sensing apparatus: and transmit the sensing data to another sensing apparatus for transmission to a server device.

Aspect 30. The non-transitory computer-readable medium of any one of Aspects 26 to 29, wherein the first task comprises transmitting data received from at least one other sensing apparatus of the self-organizing network to a server device, and wherein the instructions further cause the at least one processor to: receive, from another sensing apparatus, sensing data: and transmit the sensing data to the server device.

Aspect 31. The non-transitory computer-readable medium of any one of Aspects 26 to 30, wherein the at least one processor is further configured to: perform a second task, wherein the second task is different from the first task: and retrieve, from the at least one memory, a second power profile associated with the second task, wherein the future battery level is further predicted based on the second power profile.

Aspect 32. The non-transitory computer-readable medium of claim 31, wherein the second task comprises sensing an environment around the sensing apparatus.

Aspect 33. The non-transitory computer-readable medium of any one of Aspects 26 to 32, wherein the at least one processor is further configured to: obtain information indicating a set of sensing apparatuses and at least one sensing task associated with at least one sensing apparatus of the set of sensing apparatuses: and receive, from the at least one sensing apparatus from the set of sensing apparatuses, a predicted future battery level.

Aspect 34. The non-transitory computer-readable medium of claim 33, wherein the information indicating the set of sensing apparatuses is preconfigured based on a location of the at least one sensing apparatus.

Aspect 35. The non-transitory computer-readable medium of any one of Aspects 33 or 34, wherein the at least one processor is further configured to receive, from another sensing apparatus of the self-organizing network, an indication to perform a second task, wherein the second task comprises selecting a sensing apparatus to perform a third task.

Aspect 36. The non-transitory computer-readable medium of claim 35, wherein the third task comprises determining a duty cycle for sensing an environment, and wherein the at least one processor is further configured to: determine, based on the predicted future battery level and the at least one sensing task associated with the at least one sensing apparatus of the set of sensing apparatuses, a duty cycle for a sensing task associated with the at least one sensing apparatus: and transmit an indication of the duty cycle to the at least one sensing apparatus.

Aspect 37. The non-transitory computer-readable medium of claim 36, wherein the at least one processor is further configured to obtain location information associated with the set of sensing apparatuses, and wherein the duty cycle is further determined based on the location information.

Aspect 38. The non-transitory computer-readable medium of any one of Aspects 26 to 37, wherein the first sensing apparatus includes a transceiver for transmitting and receiving information.

Aspect 39. A first sensing apparatus of a self-organizing network, the first sensing apparatus comprising: means for receiving, from a second sensing apparatus of the self-organizing network, an indication of a first task; means for retrieving a first power profile associated with the first task; means for determining a current battery level of at least one battery; means for predicting a future battery level of the at least one battery based on the current battery level, and the first power profile associated with the first task; and means for transmitting, to another sensing apparatus, the predicted future battery level.

Aspect 40. The first sensing apparatus of Aspect 39, wherein the first sensing apparatus further comprises means for determining a duty cycle associated with the first task, and wherein the future battery level is further predicted based on the determined duty cycle of the first task Aspect 41. An apparatus comprising one or more means for performing operations according to any of Aspects 14 to 25.

What is claimed is:

1. A first sensing apparatus of a self-organizing network, comprising:
   at least one battery;
   at least one memory comprising instructions; and
   at least one processor coupled to the at least one memory and configured to:
      receive, from a second sensing apparatus of the self-organizing network, an indication of a first task;
      determine a duty cycle associated with the first task;
      retrieve, from the at least one memory, a first power profile associated with the first task;
      determine a current battery level of the at least one battery;
      predict a future battery level of the at least one battery based on the current battery level, the determined duty cycle of the first task, and the first power profile associated with the first task; and
      transmit, to a third sensing apparatus of the self-organizing network, the predicted future battery level, wherein the first sensing apparatus, the second sensing apparatus, and the third sensing apparatus are from a set of sensing apparatuses of the self-organizing network, and wherein the predicted future battery level is used to assign tasks to the first sensing apparatus.

2. The first sensing apparatus of claim 1, wherein the first task comprises at least one of:
   sensing an environment around the first sensing apparatus;
   sensing a location of the first sensing apparatus;
   collecting data received from at least one other sensing apparatus of the self-organizing network;
   processing data received from the at least one other sensing apparatus of the self-organizing network; or
   transmitting data to a server device, wherein the data is based on data received from the at least one other sensing apparatus of the self-organizing network, and wherein the server device is separate from sensing apparatuses of the self-organizing network.

3. The first sensing apparatus of claim 1, wherein the first task comprises sensing an environment around the first sensing apparatus, and wherein the at least one processor is further configured to:
   sense the environment around the first sensing apparatus to generate sensing data, wherein the environment around the first sensing apparatus is the environment around an asset being tracked by the first sensing apparatus; and
   transmit the sensing data to another sensing apparatus of the self-organizing network for transmission to a server device, and wherein the server device is separate from sensing apparatuses of the self-organizing network.

4. The first sensing apparatus of claim 1, wherein the first task comprises transmitting data received from at least one other sensing apparatus of the self-organizing network to a server device, and wherein the at least one processor is further configured to:
   receive, from another sensing apparatus of the self-organizing network, sensing data; and
   transmit the sensing data to the server device, and wherein the server device is separate from sensing apparatuses of the self-organizing network.

5. The first sensing apparatus of claim 1, wherein the at least one processor is further configured to:
   perform a second task, wherein the second task is different from the first task; and
   retrieve, from the at least one memory, a second power profile associated with the second task, wherein the future battery level is further predicted based on the second power profile.

6. The first sensing apparatus of claim 5, wherein the second task comprises sensing an environment around the first sensing apparatus.

7. The first sensing apparatus of claim 1, wherein the at least one processor is further configured to:
   obtain information indicating a set of sensing apparatuses and at least one sensing task associated with at least one sensing apparatus of the set of sensing apparatuses; and
   receive, from the at least one sensing apparatus from the set of sensing apparatuses, a predicted future battery level.

8. The first sensing apparatus of claim 7, wherein the information indicating the set of sensing apparatuses is preconfigured based on a location of the at least one sensing apparatus.

9. The first sensing apparatus of claim 7, wherein the at least one processor is further configured to receive, from another sensing apparatus of the self-organizing network, an indication to perform a second task, wherein the second task comprises selecting a sensing apparatus to perform a third task.

10. The first sensing apparatus of claim 9, wherein the third task comprises determining a duty cycle for sensing an environment, and wherein the at least one processor is further configured to:
    determine, based on the predicted future battery level and the at least one sensing task associated with the at least one sensing apparatus of the set of sensing apparatuses, a duty cycle for a sensing task associated with the at least one sensing apparatus; and
    transmit an indication of the duty cycle to the at least one sensing apparatus.

11. The first sensing apparatus of claim 10, wherein the at least one processor is further configured to obtain location information associated with the set of sensing apparatuses, and wherein the duty cycle is further determined based on the location information.

12. The first sensing apparatus of claim 1, wherein the first sensing apparatus includes a transceiver for transmitting and receiving information.

13. A method for network organization at a first sensing apparatus of a self-organizing network, the method comprising:
    receiving, from a second sensing apparatus of the self-organizing network, an indication of a first task;
    determining a duty cycle associated with the first task;
    retrieving a first power profile associated with the first task;
    determining a current battery level of at least one battery;
    predicting a future battery level of the at least one battery based on the current battery level, the determined duty cycle of the first task, and the first power profile associated with the first task; and
    transmitting, to a third sensing apparatus of the self-organizing network, the predicted future battery level, wherein the first sensing apparatus, the second sensing apparatus, and the third sensing apparatus are from a set of sensing apparatuses of the self-organizing network, and wherein the predicted future battery level is used to assign tasks to the first sensing apparatus.

14. The method of claim 13, wherein the first task comprises at least one of:
sensing an environment around the first sensing apparatus;
sensing a location of the first sensing apparatus;
collecting data received from at least one other sensing apparatus of the self-organizing network;
processing data received from the at least one other sensing apparatus of the self-organizing network; or
transmitting processed data to a server device, wherein the processed data is based on data received from the at least one other sensing apparatus of the self-organizing network, and wherein the server device is separate from sensing apparatuses of the self-organizing network.

15. The method of claim 13, wherein the first task comprises sensing an environment around the first sensing apparatus, and further comprising:
sensing the environment around the first sensing apparatus to generate sensing data, wherein the environment around the first sensing apparatus is the environment around an asset being tracked by the first sensing apparatus; and
transmitting the sensing data to another sensing apparatus of the self-organizing network for transmission to a server device, and wherein the server device is separate from sensing apparatuses of the self-organizing network.

16. The method of claim 13, wherein the first task comprises transmitting data received from at least one other sensing apparatus of the self-organizing network to a server device, and the method further comprising:
receiving, from another sensing apparatus of the self-organizing network, sensing data; and
transmitting the sensing data to the server device, and wherein the server device is separate from sensing apparatuses of the self-organizing network.

17. The method of claim 13, further comprising:
performing a second task, wherein the second task is different from the first task; and
retrieving a second power profile associated with the second task, wherein the future battery level is further predicted based on the second power profile.

18. The method of claim 17, wherein the second task comprises sensing an environment around the first sensing apparatus.

19. The method of claim 13, further comprising:
obtaining information indicating a set of sensing apparatuses and at least one sensing task associated with at least one sensing apparatus of the set of sensing apparatuses; and
receiving, from the at least one sensing apparatus from the set of sensing apparatuses, a predicted future battery level.

20. The method of claim 19, wherein the information indicating the set of sensing apparatuses is preconfigured based on a location of the at least one sensing apparatus.

21. The method of claim 19, further comprising receiving, from another sensing apparatus of a self-organizing network, an indication to perform a second task, wherein the second task comprises selecting a sensing apparatus to perform a third task.

22. The method of claim 21, wherein the third task comprises determining a duty cycle for sensing an environment, the method further comprising:
determining, based on the predicted future battery level and the at least one sensing task associated with the at least one sensing apparatus of the set of sensing apparatuses, a duty cycle for a sensing task associated with the at least one sensing apparatus; and
transmitting an indication of the duty cycle to the at least one sensing apparatus.

23. The method of claim 22, further comprising obtaining location information associated with the set of sensing apparatuses, and wherein the duty cycle is further determined based on the location information.

24. A non-transitory computer-readable medium of a first sensing apparatus of a self-organizing network, the non-transitory computer-readable medium having stored thereon instructions that, when executed by at least one processor, cause the at least one processor to:
receive, from a second sensing apparatus of the self-organizing network, an indication of a first task;
determine a duty cycle associated with the first task;
retrieve a first power profile associated with the first task;
determine a current battery level of at least one battery;
predict a future battery level of the at least one battery based on the current battery level, the determined duty cycle of the first task, and the first power profile associated with the first task; and
transmit, to a third sensing apparatus of the self-organizing network, the predicted future battery level, wherein the first sensing apparatus, the second sensing apparatus, and the third sensing apparatus are from a set of sensing apparatuses of the self-organizing network, and wherein the predicted future battery level is used to assign tasks to the first sensing apparatus.

25. The non-transitory computer-readable medium of claim 24, wherein the first task comprises at least one of:
sense an environment around the first sensing apparatus;
sense a location of the first sensing apparatus;
collect data received from at least one other sensing apparatus of the self-organizing network;
process data received from the at least one other sensing apparatus of the self-organizing network; or
transmit data to a server device, wherein the data is based on data received from the at least one other sensing apparatus of the self-organizing network, and wherein the server device is separate from sensing apparatuses of the self-organizing network.

26. A first sensing apparatus of a self-organizing network, the first sensing apparatus comprising:
means for receiving, from a second sensing apparatus of the self-organizing network, an indication of a first task;
means for determining a duty cycle associated with the first task;
means for retrieving a first power profile associated with the first task;
means for determining a current battery level of at least one battery;
means for predicting a future battery level of the at least one battery based on the current battery level, the determined duty cycle of the first task, and the first power profile associated with the first task; and
means for transmitting, to a third sensing apparatus of the self-organizing network, the predicted future battery level, wherein the first sensing apparatus, the second sensing apparatus, and the third sensing apparatus are from a set of sensing apparatuses of the self-organizing network, and wherein the predicted future battery level is used to assign tasks to the first sensing apparatus.

\* \* \* \* \*